US009071146B2

(12) United States Patent
Matthews et al.

(10) Patent No.: US 9,071,146 B2
(45) Date of Patent: Jun. 30, 2015

(54) AC VOLTAGE SENSOR WITH LOW POWER CONSUMPTION

(71) Applicant: Power Integrations, Inc., San Jose, CA (US)

(72) Inventors: David Michael Hugh Matthews, Los Gatos, CA (US); Balu Balakrishnan, Saratoga, CA (US); Zhao-Jun Wang, San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 54 days.

(21) Appl. No.: 13/801,963

(22) Filed: Mar. 13, 2013

(65) Prior Publication Data
US 2014/0268938 A1 Sep. 18, 2014

(51) Int. Cl.
*G05F 5/00* (2006.01)
*H02M 1/32* (2007.01)
*H02M 3/335* (2006.01)
*H02M 7/06* (2006.01)
*H02M 1/00* (2007.01)

(52) U.S. Cl.
CPC ............ *H02M 1/32* (2013.01); *H02M 3/33523* (2013.01); *H02M 7/06* (2013.01); *H02M 2001/0032* (2013.01)

(58) Field of Classification Search
USPC ......... 323/234, 235, 265, 282, 283, 284, 285, 323/299, 300, 301; 363/21.03, 21.04, 363/21.05, 21.12, 21.13
See application file for complete search history.

(56) References Cited

U.S. PATENT DOCUMENTS

| | | | |
|---|---|---|---|
| 5,162,970 A | 11/1992 | Davis, Jr. et al. | |
| 5,650,357 A | 7/1997 | Dobkin et al. | |
| 5,729,120 A * | 3/1998 | Stich et al. | 323/237 |
| 6,147,883 A | 11/2000 | Balakrishnan et al. | |
| 6,384,478 B1 | 5/2002 | Pour | |
| 6,998,952 B2 | 2/2006 | Zhou et al. | |
| 7,257,008 B2 * | 8/2007 | Yang et al. | 363/21.12 |

(Continued)

FOREIGN PATENT DOCUMENTS

EP 2355316 A1 8/2011
JP H 09-260569 10/1997

OTHER PUBLICATIONS

EP Application No. 14158499.5—European Search Report, issued Jan. 23, 2015 (3 pages).

(Continued)

*Primary Examiner* — Jeffrey Gblende
(74) *Attorney, Agent, or Firm* — Blakely Sokoloff Taylor & Zafman LLP

(57) ABSTRACT

A power converter controller includes an input sense circuit to receive an input sense signal representative of an input of a power converter. A zero-crossing detector is coupled to the input sense circuit to be responsive to the input sense signal falling below a first zero-crossing threshold and rising above a second zero-crossing threshold to determine zero-crossing intervals. A timer circuit is coupled to the zero-crossing detector to determine peak intervals and to synchronize an enable signal generated to enable the input sense circuit to sense the input of the power converter during the peak intervals of the input of the power converter. A comparator circuit is coupled to the input sense circuit and the timer circuit to detect if the input of the power converter is greater or less than one or more thresholds during the peak intervals of the input of the power converter.

27 Claims, 16 Drawing Sheets

(56) References Cited

U.S. PATENT DOCUMENTS

| | | |
|---|---|---|
| 7,468,547 B2 | 12/2008 | Harvey |
| 7,524,731 B2 | 4/2009 | Wang |
| 7,619,297 B2 | 11/2009 | Wang |
| 7,868,431 B2 | 1/2011 | Feng et al. |
| 7,884,696 B2 | 2/2011 | Hébert et al. |
| 8,093,983 B2 | 1/2012 | Fouquet et al. |
| 8,772,909 B1 | 7/2014 | Vinciarelli |
| 2004/0214376 A1 | 10/2004 | Gibson et al. |
| 2005/0271148 A1 | 12/2005 | Dupuis |
| 2008/0191648 A1* | 8/2008 | Ito et al. ............... 318/128 |
| 2010/0014334 A1* | 1/2010 | Katou et al. ............ 363/126 |
| 2011/0279101 A1* | 11/2011 | Sasaki et al. ............ 323/271 |
| 2011/0317322 A1 | 12/2011 | Chien et al. |
| 2014/0268951 A1 | 9/2014 | Wang et al. |

OTHER PUBLICATIONS

EP Application No. 14158498.7—European Search Report, issued Jan. 23, 2015 (3 pages).

EP Application No. 14158499.5—European Office Action, issued Feb. 5, 2015 (6 pages).

EP Application No. 14158498.7—European Office Action, issued Feb. 5, 2015 (5 pages).

* cited by examiner

AC VOLTAGE SENSOR WITH LOW POWER CONSUMPTION

BACKGROUND INFORMATION

1. Field of the Disclosure

The present invention is related to power converters. More specifically, examples of the present invention are related to power converters that operate from an ac input voltage.

2. Background

Controllers for off-line power converters often must measure the ac input voltage to perform functions such as under-voltage detection, over-voltage detection, and fast reset from a momentary loss of input voltage. Since the ac voltage varies periodically between a peak positive value and a peak negative value at the frequency of the power line, the ac line voltage is typically represented numerically as a quantity that is proportional to the peak voltage. For example, the common ac power line voltage referred to as 120 volts is a root mean square (rms) value of a sine wave that is obtained from the magnitude of the peak voltage (169.7 volts) divided by the square root of two. An ac voltage of 120 volts rms is equivalent to a dc voltage of 120 volts when both are applied to the same resistive load such as an incandescent lamp. Controllers for power converters that are required to operate in particular ways within specified limits of an ac input voltage generally must determine the magnitude of the peak of the ac input voltage.

Circuits that measure an input voltage typically do so by using a potential divider across the input voltage that provides a known fraction of the input voltage that is low enough for the circuit to handle. In order to reduce power consumption, the components of the divider are selected to take no more current than necessary from the input. To reduce power consumption further and to reduce the number of components, a current that represents the input voltage can be used instead of a potential divider. However, the current needs to be large enough to guarantee a reliable measurement in the presence of noise. The power taken from the source of input voltage is proportional to the product of the voltage and the current. Since the peak value of the ac input may be hundreds of volts, even the smallest current acceptable for reliable measurement can still result in a significant loss of power, especially when the power converter has a light load or no load. Power converters need a controller that can sense the ac power line reliably with low power consumption.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
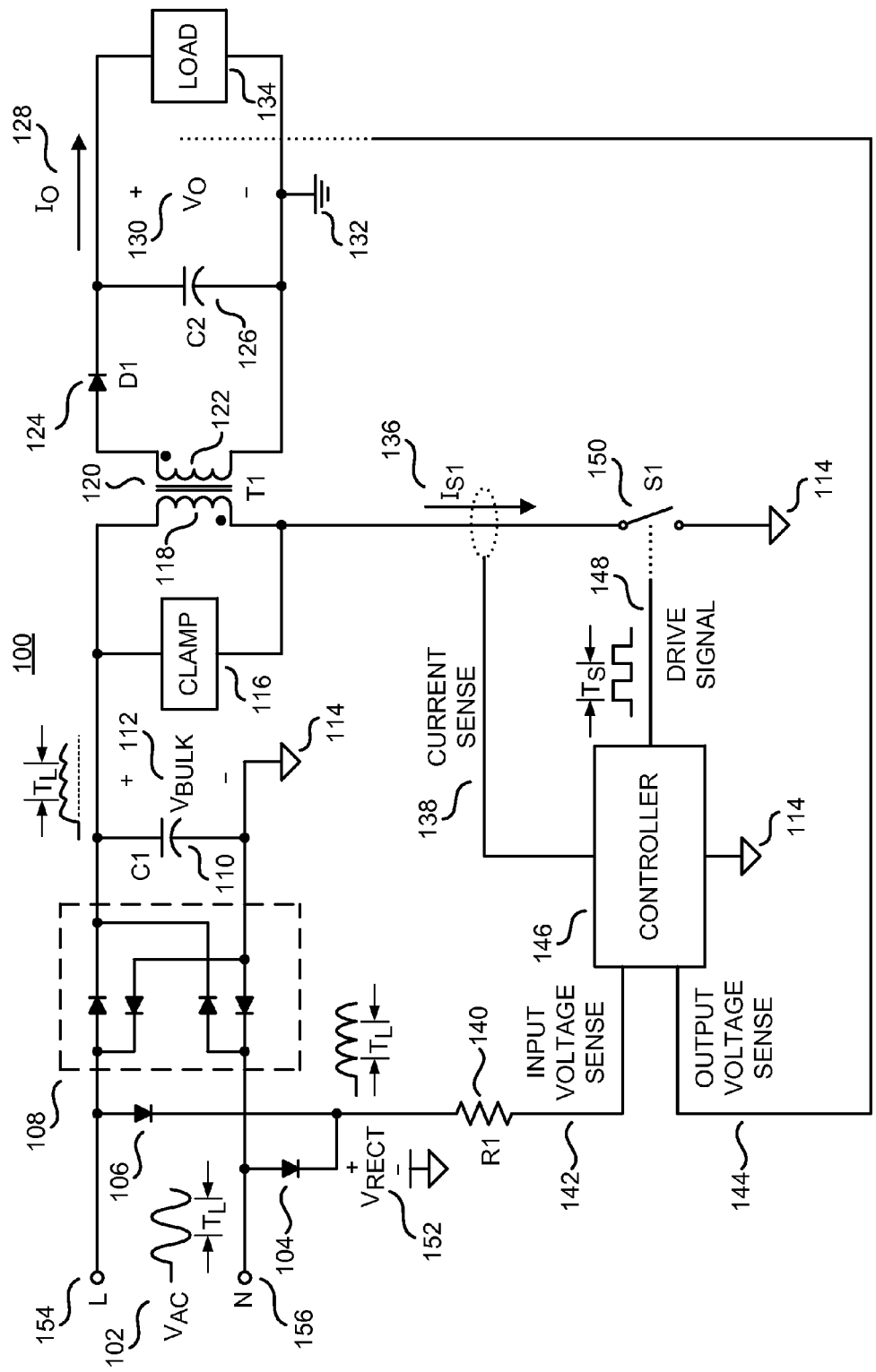
FIG. 1 is a schematic diagram of an example power converter including a controller that senses an ac input voltage in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

The schematic diagram of FIG. 1 shows the salient features of one example of an ac-dc power converter 100 (ac input, dc output) receiving an ac input voltage $V_{AC}$ 102 that has a substantially sinusoidal waveform with a period $T_L$. The ac line period $T_L$ is the reciprocal of the ac line frequency. The standard ac line frequency is nominally either 50 hertz or 60 hertz, depending on the country and location of the power system. Power converters designed for worldwide operation typically accept ac line frequencies between 47 hertz and 63 hertz, corresponding to ac line periods between approximately 21 milliseconds and 16 milliseconds, respectively. A controller 146 in the example power converter of FIG. 1 includes an ac voltage sensor in accordance with the teaching of the present invention. The example ac-dc power converter of FIG. 1 provides a substantially dc output voltage $V_O$ 130 and a substantially dc output current $I_O$ 128 to a load 134.

The example power converter of FIG. 1 is known as a flyback power converter because of its particular circuit topology. A power converter that is controlled to produce a regulated output is sometimes called a regulated power supply. A flyback converter that produces a regulated output is sometimes called a flyback power supply. Those skilled in the art will appreciate that the invention described in this disclosure is not limited to power converters that use a particular circuit topology, and that any type of power converter that operates from an ac input voltage may benefit from the features of the invention.

In the example power converter of FIG. 1, a full-wave bridge rectifier 108 receives ac input voltage $V_{AC}$ 102 between line input terminal L 154 and neutral input terminal N 156 to produce a dc voltage $V_{BULK}$ 112 on an input capacitor C1 110. Dc voltage $V_{BULK}$ 112 is positive with respect to an input return 114, and has a time varying component at twice the frequency (half the period) of the ac line due to energy being removed from the capacitor by the power converter between peaks of the line voltage waveform 102. The maximum value of the bulk voltage $V_{BULK}$ 112 is approximately the peak magnitude of the ac input voltage $V_{AC}$ 102. The minimum value of the bulk voltage $V_{BULK}$ 112 is substantially greater than zero when the ac input voltage $V_{AC}$ 102 is present, and the bulk voltage $V_{BULK}$ 112 may require tens of seconds to decay below a minimum threshold value after the ac input voltage $V_{AC}$ 102 is removed. A power converter controller that must detect an input under-voltage condition within a few periods of the ac input voltage is therefore unable to do so from a measurement of the bulk voltage $V_{BULK}$ 112.

The dc voltage $V_{BULK}$ 112 in the example of FIG. 1 is coupled to a coupled inductor T1 120 that is sometimes referred to as a transformer. Coupled inductor T1 120 is an energy transfer element in the example of FIG. 1. Coupled inductor T1 120 includes a primary winding 118 and a secondary winding 122. Primary winding 118 is sometimes referred to as an input winding, and secondary winding 122 is sometimes referred to as an output winding. In the example of FIG. 1, one end of secondary winding 122 is coupled to an output return 132. In other examples, coupled inductor T1 120 may have additional windings coupled to the output return 132, and additional windings coupled to the input return 114. The additional windings coupled to the output return 132 are sometimes referred to as output windings. Additional windings coupled to the input return 114 are sometimes referred to as bias windings, auxiliary windings, or primary sensing windings.

One end of primary winding 118 receives the dc voltage $V_{BULK}$ 112 in the example of FIG. 1. The other end of primary winding 118 is coupled to a switch S1 150 that opens and closes in response to a drive signal from a controller 146. A clamp circuit 116 is coupled across the ends of primary winding 118 to protect the switch S1 150 from excessive voltage that may result from the switching of switch S1 150.

In a practical power converter, switch S1 150 is typically a semiconductor device such as for example a transistor that is controlled by a drive signal to be either open or closed. A switch that is open cannot conduct current. A switch that is closed may conduct current.

In the example of FIG. 1, switch S1 150 receives a drive signal from a drive signal terminal 148 of controller 146. The drive signal changes periodically between a high value and low value with period $T_S$ that is the switching period. The switching period $T_S$ is much less than the ac line period $T_L$. The switching period $T_S$ is the reciprocal of the switching frequency. In one example, the switching period $T_S$ is about 15 microseconds or less when the power converter is providing maximum output power to load 134, whereas the ac line period $T_L$ is about 20 milliseconds. In other words, the ac line period $T_L$ is typically more than 1000 times greater than the switching period $T_S$, so that there can be typically more than 1000 switching periods within one ac line period.

In the example power converter of FIG. 1, the switching of switch S1 150 produces pulsating currents in the primary winding 118 and in the secondary winding 122 of coupled inductor T1 120. Current from secondary winding 122 is rectified by diode D1 124 and filtered by an output capacitor C2 126 to produce an output voltage $V_O$ 130 and an output current $I_O$ 128. In the example of FIG. 1, output voltage $V_O$ 130 is positive with respect to an output return 132.

In the example of FIG. 1, the input return 114 is galvanically isolated from the output return 132. Galvanic isolation prevents dc current between input and output of the power converter. In other words, a dc voltage applied between an input terminal and an output terminal of a power converter with galvanic isolation will produce substantially no dc current between the input terminal and the output terminal of the power converter. It is appreciated that in other examples, power converters without galvanic isolation may be used depending on system isolation requirements and would still benefit from the teachings of the present invention.

In the example of FIG. 1, controller 146 receives an input voltage sense signal at an input voltage sense terminal 142, an output voltage sense signal at an output voltage sense terminal 144, and a current sense signal at a current sense terminal 138 for the regulation of output voltage $V_O$ 130. The voltages of controller 146 are referenced to the input return 114. The output voltage sense signal received at output voltage sense terminal 144 may be galvanically isolated from the output return 132 by any known technique (not shown in FIG. 1) such as for example by the use of an optocoupler, or for example by the use of a winding on a transformer, or for example by the use of magnetically coupled conductors that are part of a leadframe of an integrated circuit package, or for example by the use of special high voltage safety capacitors.

Many known techniques may also be applied to sense the switch current $I_{S1}$ 136 for the current sense signal at the current sense terminal 138. For example, the switch current $I_{S1}$ 136 may be sensed as a voltage on a discrete resistor, or as a current from a current transformer, or as a voltage across the on-resistance of a metal oxide semiconductor field effect transistor (MOSFET) or as a current from the sense output of a current sensing field effect transistor (senseFET).

In the example of FIG. 1, the ac input voltage $V_{AC}$ 102 is sensed as a rectified voltage $V_{RECT}$ 152 at the cathodes of diodes 104 and 106. The anode of diode 106 is coupled to the line input terminal L 154 and the anode of diode 104 is coupled to the neutral input terminal N 156. The rectified input voltage $V_{RECT}$ 152 is positive with respect to the input return 114. The rectified input voltage $V_{RECT}$ 152 is coupled to an input sensing resistor R1 140 before it is received at the input voltage sense terminal 142 of controller 146. Current in resistor R1 returns to the input through the bridge rectifier 108.

In the example of FIG. 1, rectified voltage $V_{RECT}$ 152 is a full-wave rectified voltage. The peaks of rectified voltage $V_{RECT}$ 152 in the example of FIG. 1 are coincident with the positive and negative peaks of the ac input voltage $V_{AC}$ 102, and the valleys of rectified voltage $V_{RECT}$ 152 are coincident with the with the zero-crossings of the ac input voltage $V_{AC}$ 102. In contrast to the dc bulk voltage $V_{BULK}$ 112, the rectified voltage $V_{RECT}$ 152 in the example of FIG. 1 goes to zero twice in each ac line period $T_L$. In other examples that will be illustrated later in this disclosure, rectified voltage $V_{RECT}$ 152 may be a half-wave rectified voltage that has one peak value in each ac line period $T_L$.

Figure 2A:
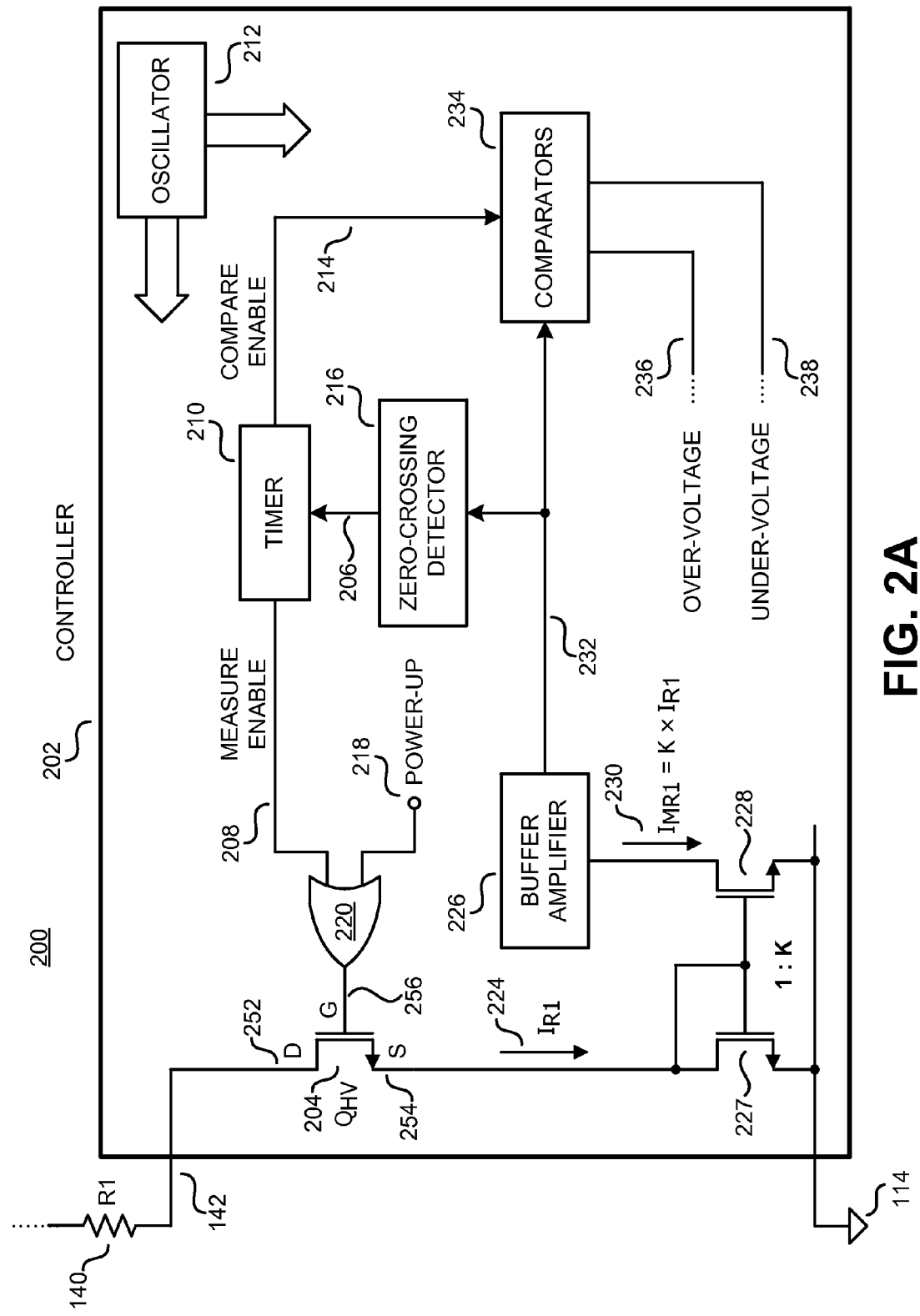
FIG. 2A is a functional block diagram of an example power converter controller illustrating elements of an ac voltage sensor with low power consumption in accordance with the teachings of the present invention.

FIG. 2A is a functional block diagram 200 of an example controller 202 for the example power converter of FIG. 1 illustrating elements of an ac voltage sensor with low power consumption in accordance with the teachings of the present invention. In the example of FIG. 2A, controller 202 is an integrated circuit that includes an optional oscillator 212, a timer 210, a zero-crossing detector 216, a buffer amplifier 226, comparators 234, an OR gate 220, a high voltage transistor $Q_{HV}$ 204, and a current mirror formed by transistors 227 and 228. In one example, buffer amplifier 226, OR gate 220, high voltage transistor $Q_{HV}$ 204, and the current mirror formed by transistors 227 and 228 may be considered as being part of an input sense circuit included in controller 202.

Signals from optional oscillator 212 are typically available to all circuits in controller 202 for synchronization and timing. In some controllers, signals for synchronization and timing may be received from any suitable marker of time instead of an oscillator, such as for example a system clock. It will be appreciated by those skilled in the art that a power converter controller need not be entirely within an integrated circuit. For example, high voltage transistor $Q_{HV}$ 204 may be a discrete transistor outside an integrated circuit and other elements of the controller may be included in one or more integrated circuits.

In the example of FIG. 2A, controller 202 receives an input voltage sense signal at an input voltage sense terminal 142 that is coupled to one end of an input sensing resistor R1 140. The other end of the input sensing resistor R1 140 may be coupled to a rectified ac input voltage, for example $V_{RECT}$ 152 shown in the example of FIG. 1. The input voltage sense terminal 142 of the example controller 202 in FIG. 2A is a high voltage terminal with respect to the input return 114. A high voltage terminal of an integrated circuit is generally one that is adapted to withstand more than 30 volts with respect to the ground terminal without damage or disruption to the operation of the integrated circuit. In the example of FIG. 2A, the voltage at the input voltage sense terminal 142 may be as high as the peak of the rectified voltage $V_{RECT}$ 152 that may exceed several hundred volts.

In the example of FIG. 2A, the input voltage sense terminal 142 is coupled to the drain D 252 of a high voltage transistor $Q_{HV}$ 204. In one example, high voltage transistor $Q_{HV}$ 204 is an n-channel enhancement mode metal oxide semiconductor field effect transistor (MOSFET). In the example of FIG. 2A, high voltage transistor $Q_{HV}$ 204 has a gate G 256 coupled to the output of an OR gate 220, and a source S 254 coupled to the drain and gate of a low voltage MOSFET 227.

When high voltage transistor $Q_{HV}$ 204 is in an ON state it may conduct current between drain and source. When high voltage transistor $Q_{HV}$ 204 is in an OFF state it cannot conduct current. A transistor in an ON state may be considered to be a switch that is closed. A transistor in an OFF state may be considered to be a switch that is open. High voltage transistor $Q_{HV}$ 204 is in an ON state when the voltage at the gate G 256 is greater than the voltage at the source S 254 by more than a threshold voltage $V_T$. Conversely, high voltage transistor $Q_{HV}$ 204 is in an OFF state when the voltage at the gate G 256 is not greater than the voltage at the source S 254 by more than a threshold voltage $V_T$. A transistor in an ON state is sometimes referred to as being ON. A transistor in an OFF state is sometimes referred to as being OFF.

In one example, the threshold voltage $V_T$ of high voltage transistor $Q_{HV}$ 204 is typically 2.5 volts. In one example, the output of OR gate 220 is approximately 5.8 volts at a logic high level and the output of OR gate 220 is substantially zero volts at a logic low level. In other words, high voltage transistor $Q_{HV}$ 204 may conduct current when the output of OR gate 220 is at a high logic level, and the high voltage transistor $Q_{HV}$ 204 cannot conduct current when the output of OR gate 220 is at a logic low level.

The output of OR gate 220 in the example of FIG. 2A determines when high voltage transistor $Q_{HV}$ 204 is ON and when high voltage transistor $Q_{HV}$ 204 is OFF. When high voltage transistor $Q_{HV}$ 204 in the example controller of FIG. 2A is ON, input voltage sense terminal 142 may receive current $I_{R1}$ 224 from the ac input $V_{AC}$ 102 through input sensing resistor R1 140. When high voltage transistor $Q_{HV}$ 204 is OFF, input voltage sense terminal 142 receives substantially no current from the ac input $V_{AC}$ 102. In other words, controller 202 in the example of FIG. 2A senses input voltage $V_{AC}$ 102 only when high voltage transistor $Q_{HV}$ 204 is ON. Controller 202 in the example of FIG. 2A reduces the power consumed in sensing ac input voltage $V_{AC}$ 102 by limiting the times when input voltage sense terminal 142 receives current from the ac input $V_{AC}$ 102 in accordance with the teachings of the present invention.

High voltage transistor $Q_{HV}$ 204 in the example of FIG. 2A may be considered a line sense switch that closes to allow sensing of the ac input line $V_{AC}$ 102, and that opens to prevent power consumption from sensing of the ac input line $V_{AC}$ 102 in accordance with the teachings of the present invention.

When high voltage transistor $Q_{HV}$ 204 in the example controller of FIG. 2A is ON, a current $I_{R1}$ 224 that is representative of the rectified ac line voltage $V_{RECT}$ 152 may enter the drain of transistor 227. Transistors 227 and 228 form a current mirror with a ratio K that scales the current $I_{R1}$ 224 in the drain of transistor 227 to a mirrored current $I_{MR1}$ 230 that is $I_{R1}$ multiplied by K in the drain of transistor 228. As shown in the depicted example, mirrored current $I_{MR1}$ is processed by a buffer amplifier 226, which is coupled to produce a buffered sense signal 232. Buffer amplifier 226 in the example of FIG. 2A may provide amplification, level shifting, current-to-voltage conversion, and any other transformation known in the art as needed to make the buffered sense signal 232 compatible with the circuits that receive it, such as for example a zero-crossing detector 216 and comparators 234.

A zero-crossing detector 216 receives the buffered sense signal 232 to produce a zero-crossing signal 206 that is received by a timer 210. The current $I_{R1}$ 224 does not go negative in the example of FIG. 2A, but the current $I_{R1}$ 224 goes substantially to zero when the ac input voltage $V_{AC}$ 102 passes through zero. Therefore, the zero-crossings of the ac input voltage $V_{AC}$ 102 may be deduced from the time the current $I_{R1}$ 224 goes below a first zero-crossing threshold near zero and the time the current $I_{R1}$ 224 goes above a second zero-crossing threshold near zero. Timer 210 receives the zero-crossing signal 206 to synchronize the timer 210 to the frequency and zero-crossings of the ac input voltage $V_{AC}$ 102. A timing diagram is presented later in this disclosure to illustrate the relationships among various signals in the example controller of FIG. 2A.

Timer 210 in the example of FIG. 2A produces a MEASURE ENABLE signal 208 that is received at an input of OR gate 220. High voltage transistor $Q_{HV}$ 204 is ON when an input of OR gate 220 is at a logic high level. In one example, MEASURE ENABLE signal 208 is a logic high level during a portion of the ac line period where the ac input voltage $V_{AC}$ 102 is expected to cross zero. In one example, MEASURE ENABLE signal 208 is also at a logic high level during a portion of the ac line period where the ac input voltage $V_{AC}$ 102 is expected to reach a peak value. In other words, controller 202 in the example of FIG. 2A senses the ac input voltage $V_{AC}$ 102 when MEASURE ENABLE signal 208 is at a logic high level.

Timer 210 in the example of FIG. 2A also produces a COMPARE ENABLE signal 214 that is received by comparators 234. In the example of FIG. 2A, comparators 234 assess the value of buffered sense signal 232 during a portion of the ac line period where the ac input voltage $V_{AC}$ 102 is expected to reach a peak value to determine if the ac input voltage $V_{AC}$ 102 is within a specified range for the power converter to operate. Comparators 234 assert either an OVER-VOLTAGE signal 236 or an UNDER-VOLTAGE signal 238 in response to the COMPARE ENABLE signal 214 when the ac input voltage $V_{AC}$ 102 is outside the specified range of operation for the power converter.

In the example of FIG. 2A, an input of OR gate 220 receives a POWER-UP signal 218. POWER-UP signal 218 is a logic high level during several periods of the ac input line immediately after the ac input voltage $V_{AC}$ 102 is applied and the controller 202 powers up, and then POWER-UP signal 218 returns to a logic low level until the ac input voltage $V_{AC}$ 102 is removed and reapplied. In one example, when POWER-UP signal 218 is a logic high level, high voltage transistor $Q_{HV}$ 204 is ON continuously and timer 210 synchronizes to the zero-crossings of the ac input voltage $V_{AC}$ 102. After timer 210 is synchronized to the ac input, controller 202 begins sensing the ac input voltage $V_{AC}$ 102 in a low power consumption mode, receiving current from the ac input voltage $V_{AC}$ 102 only at limited times in accordance with the teaching of the present invention.

Figure 2B:
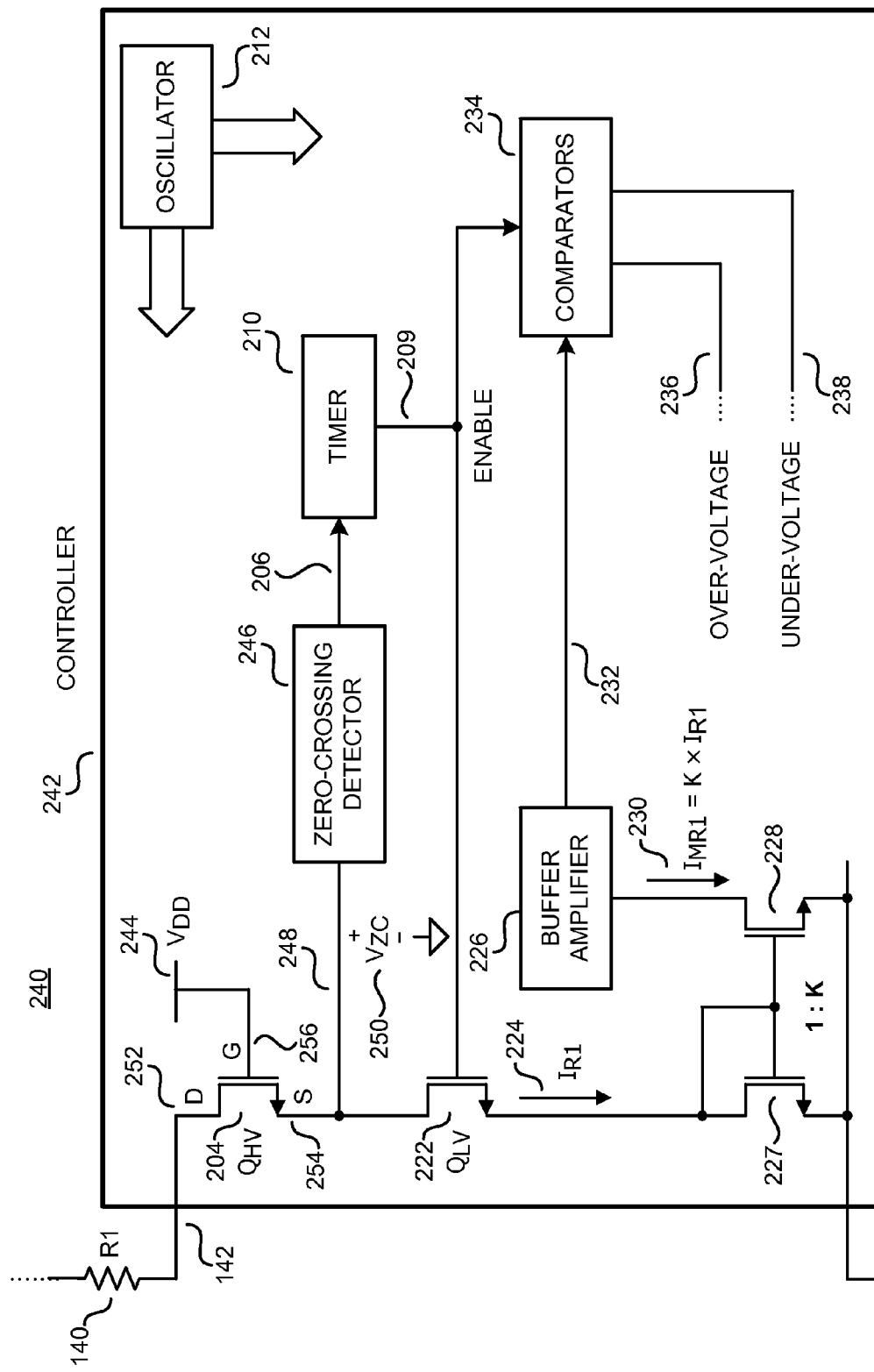
FIG. 2B is a functional block diagram of an example power converter controller illustrating elements of an alternative ac voltage sensor with low power consumption in accordance with the teachings of the present invention.

FIG. 2B is a functional block diagram 240 of an example controller 242 for the power converter in FIG. 1 illustrating elements of an alternative ac voltage sensor with low power consumption in accordance with the teachings of the present invention. FIG. 2B includes many of the elements illustrated in the example of FIG. 2A.

In the alternative example of FIG. 2B, the gate G 256 of high voltage transistor $Q_{HV}$ 204 is coupled to a regulated internal voltage $V_{DD}$ 244, and the source S 254 of high voltage transistor $Q_{HV}$ 204 is coupled to the drain of a low voltage transistor $Q_{LV}$ 222. In one example, the regulated internal voltage $V_{DD}$ 244 is approximately 5.8 volts. The source of low voltage transistor $Q_{LV}$ 222 is coupled to transistor 227 of the current mirror as in FIG. 2A. A benefit of the alternative configuration of the ac voltage sensor in FIG. 2B is that it is not necessary for the timer 210 to turn a transistor ON during a portion of the ac line period where the ac input voltage $V_{AC}$ 102 is expected to cross zero. Instead, a voltage $V_{ZC}$ 250 is present at the source S 254 of high voltage transistor $Q_{HV}$ 204 that may be received by zero-crossing detector 246 when low voltage transistor $Q_{LV}$ 222 is OFF. Since the alternative configuration of the ac voltage sensor of FIG. 2B does not require current from the ac input voltage $V_{AC}$ 102 to determine zero-crossings, the voltage $V_{ZC}$ 250 may be monitored continuously for indications of zero-crossings without a penalty in power consumption.

When low voltage transistor $Q_{LV}$ 222 is OFF, the voltage $V_{ZC}$ 250 at its drain follows the rectified voltage $V_{RECT}$ 152 to an upper limit of $V_{DD}$ 244 minus the threshold voltage $V_T$ of high voltage transistor $Q_{HV}$ 204. The voltage $V_{ZC}$ 250 is zero when the ac input voltage $V_{AC}$ 102 passes through zero. Therefore, the voltage $V_{ZC}$ 250 at the drain of low voltage transistor $Q_{LV}$ 222 may be used to sense the zero-crossings of the ac input voltage $V_{AC}$ 102.

In the alternative example of FIG. 2B, timer 210 produces an ENABLE signal 209 that is coupled to the gate of low voltage transistor $Q_{LV}$ 222 and is received by the comparators 234. ENABLE signal 209 is a logic high level during a portion of the ac line period where the ac input voltage $V_{AC}$ 102 is expected to reach a peak value. When ENABLE signal 209 is high, low voltage transistor $Q_{LV}$ 222 turns ON allowing controller 242 to sense the peak of the ac input voltage $V_{AC}$ 102. When ENABLE signal 209 is low, low voltage transistor $Q_{LV}$ 222 turns OFF, preventing controller 242 from receiving current from the ac input voltage $V_{AC}$ 102 in accordance with the teaching of the present invention.

Low voltage transistor $Q_{LV}$ 222 in the alternative example of FIG. 2B may be considered a line sense switch that closes to allow sensing of the ac input line $V_{AC}$ 102, and that opens to stop the sensing circuit from consuming power from the ac input voltage $V_{AC}$ 102.

Figure 2C:
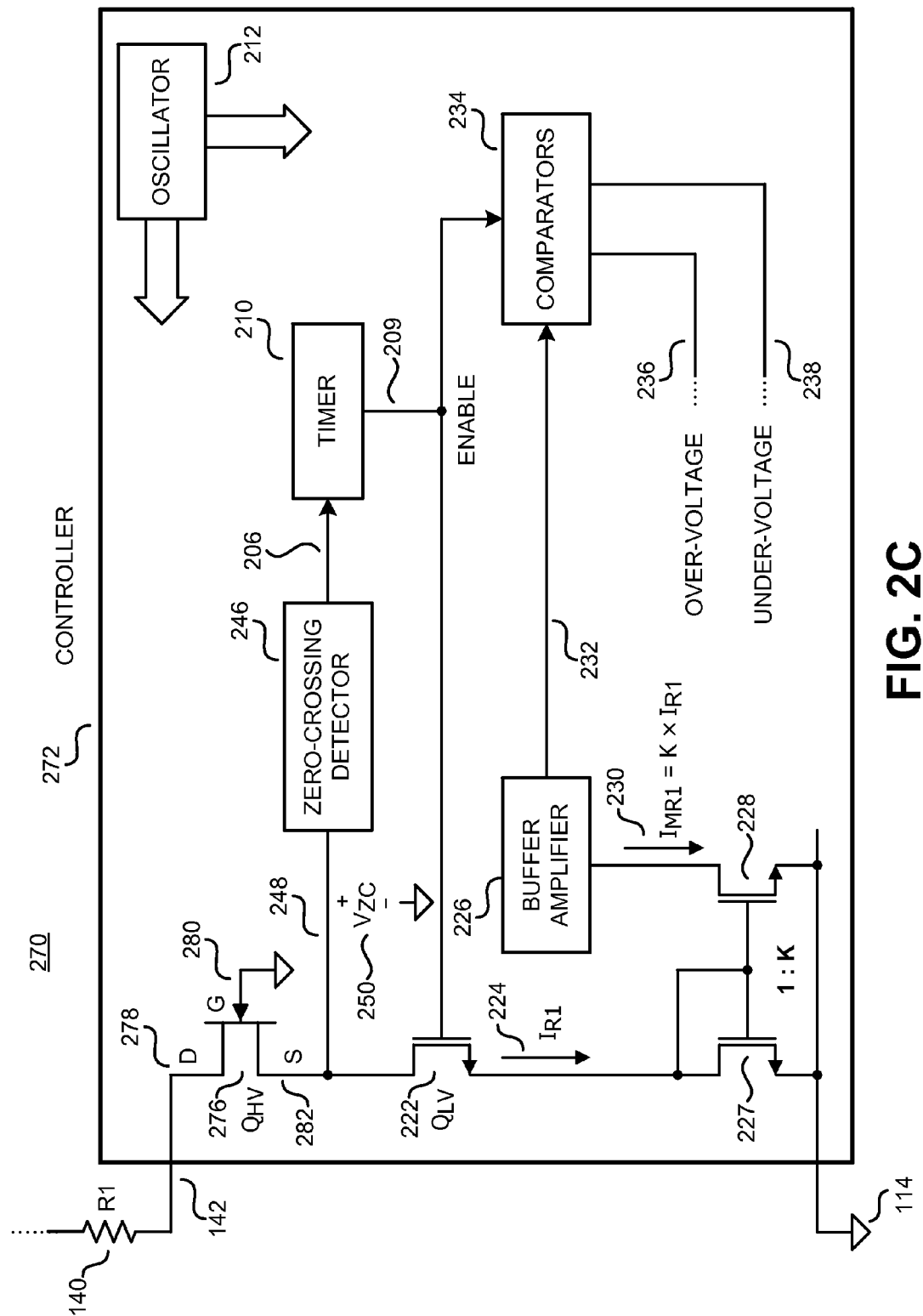
FIG. 2C is a functional block diagram of an example power converter controller illustrating elements of another alternative ac voltage sensor with low power consumption in accordance with the teachings of the present invention.

FIG. 2C is a functional block diagram 270 of another example controller 272 for the example power converter in FIG. 1 illustrating elements of another alternative ac voltage sensor with low power consumption in accordance with the teachings of the present invention. FIG. 2C includes many of the elements illustrated in the examples of FIG. 2A and FIG. 2B.

The alternative example of FIG. 2C replaces the MOSFET that is high voltage transistor $Q_{HV}$ 204 in FIG. 2B with an n-channel junction field effect transistor (JFET) $Q_{HV}$ 276. Whereas the gate G 256 of the high voltage MOSFET $Q_{HV}$ 204 in FIG. 2B is coupled to the regulated internal voltage $V_{DD}$ 244, the gate G 280 of high voltage JFET $Q_{HV}$ 276 in FIG. 2C is coupled to the input return 114.

The drain D 278 of high voltage transistor $Q_{HV}$ 276 in the alternative example of FIG. 2C is coupled to the input voltage sense terminal 142, and the source S 282 of high voltage JFET $Q_{HV}$ 276 is coupled to low voltage transistor $Q_{LV}$ 222. As such, JFET $Q_{HV}$ 276 in the example of FIG. 2C performs the same function as MOSFET $Q_{HV}$ 204 in FIG. 2B. JFET $Q_{HV}$ 276 in the example of FIG. 2C is ON when low voltage transistor $Q_{LV}$ 222 is ON, and JFET $Q_{HV}$ 276 in the example of FIG. 2C is OFF when low voltage transistor $Q_{LV}$ 222 is OFF.

When low voltage transistor $Q_{LV}$ 222 in the example of FIG. 2C is OFF, the voltage $V_{ZC}$ 250 at its drain follows the rectified voltage $V_{RECT}$ 152 to an upper limit that is the pinch-off voltage of high voltage JFET $Q_{HV}$ 276. In one example, the pinch-off voltage of high voltage JFET $Q_{HV}$ 276 is less than 30 volts. Therefore, the voltage $V_{ZC}$ 250 at the drain of low voltage transistor $Q_{LV}$ 222 may be used to sense the zero-crossings of the ac input voltage $V_{AC}$ 102. In another example where the pinch-off voltage of high voltage JFET $Q_{HV}$ 276 is greater than 30 volts, a high voltage transistor may be substituted for low voltage transistor $Q_{LV}$ 222, and buffer circuits in the zero-crossing detector 246 may clamp the voltage at a lower value suitable for low-voltage detector circuits.

Figure 3A:
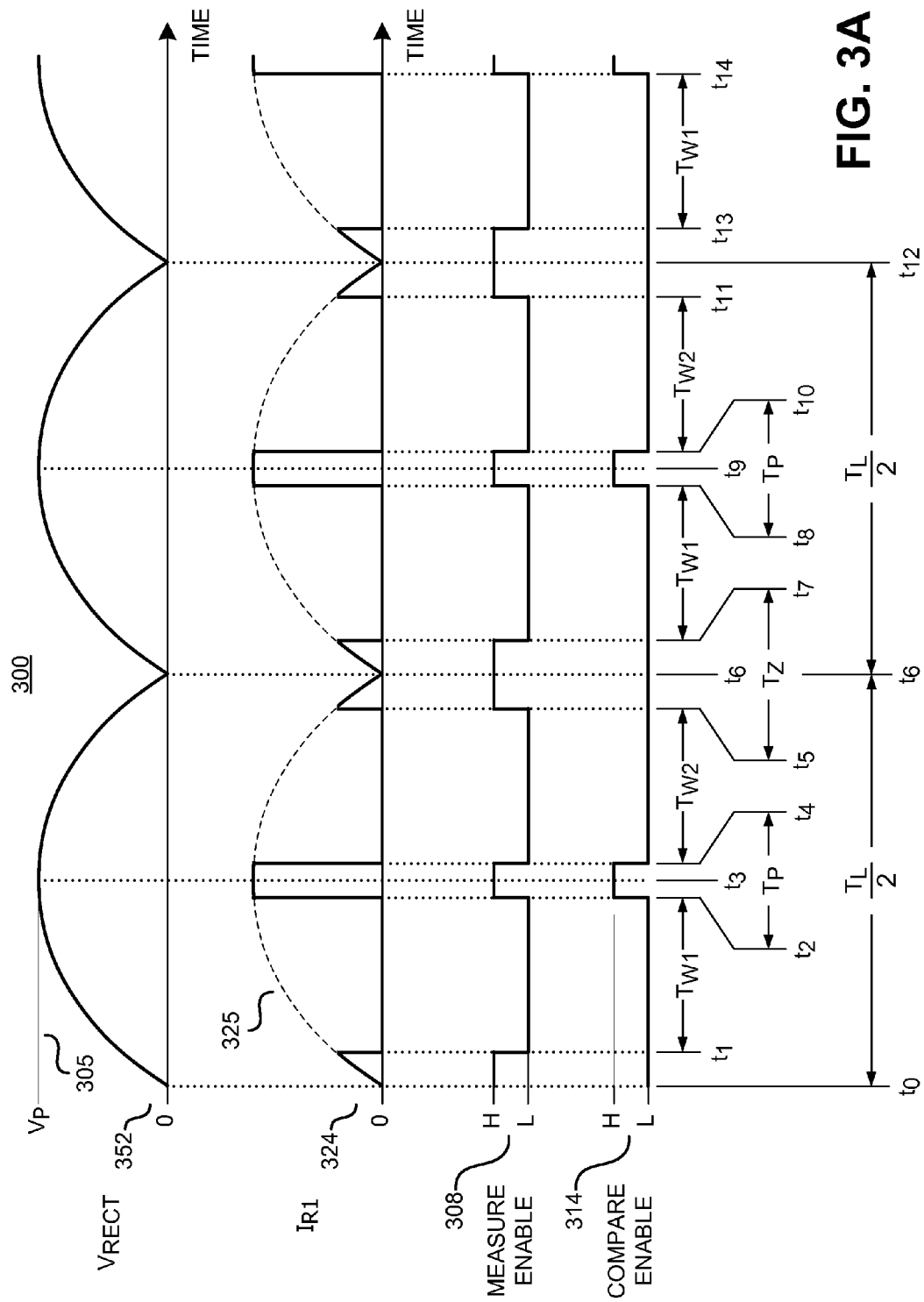
FIG. 3A is a timing diagram showing example waveforms that illustrate the operation of the example ac voltage sensor with low power consumption shown in FIG. 2A in accordance with the teachings of the present invention.

FIG. 3A is a timing diagram 300 that shows example waveforms illustrating the operation of the example ac voltage sensor with low power consumption shown in FIG. 2A as used in the example power converter of FIG. 1. The example waveforms of FIG. 3A are for steady-state conditions after transient disturbances from the application of ac input voltage $V_{AC}$ 102 have decayed to negligible values, and when the POWER-UP signal 218 is at a logic low level.

Waveform 352 in the example of FIG. 3A represents the rectified voltage $V_{RECT}$ 152. The rectified voltage $V_{RECT}$ 152 in the example of FIG. 3A is a full-wave rectified voltage. The interval from time $t_0$ to time $t_{12}$ is one period $T_L$ of the ac input voltage $V_{AC}$ 102. A period of the (full-wave) rectified voltage, such as the interval from time $t_0$ to $t_6$, or such as the interval from time $t_6$ to $t_{12}$, is half the period $T_L$ of the ac input voltage $V_{AC}$ 102. Waveform 352 in FIG. 3A shows that rectified voltage $V_{RECT}$ 152 is zero at times $t_0$, $t_6$, and $t_{12}$. Waveform 352 in FIG. 3A shows that rectified voltage $V_{RECT}$ 152 reaches a peak value $V_P$ 305 at times $t_3$ and $t_9$.

Waveform 308 in FIG. 3A shows that MEASURE ENABLE signal 208 is at a logic high level H from time $t_0$ to time $t_1$, from time $t_2$ to time $t_4$, from time $t_5$ to time $t_7$, from time $t_8$ to time $t_{10}$, from time $t_{11}$ to time $t_{13}$, and at time $t_{14}$. MEASURE ENABLE signal 208 is at a logic low level L at all other times shown in FIG. 3A.

The timing diagram 300 of FIG. 3A shows that high voltage transistor $Q_{HV}$ 204 in FIG. 2A is ON when MEASURE ENABLE signal 208 in waveform 308 is high, allowing input voltage sense terminal 142 to receive current $I_{R1}$ 224 as shown in waveform 324. Since the current $I_{R1}$ 224 is proportional to the reciprocal of the resistance of input sensing resistor $R_1$ 140 when high voltage transistor $Q_{HV}$ 204 is ON, waveform 324 in FIG. 3A shows that current $I_{R1}$ 224 follows the envelope 325 that is proportional to waveform 352 of rectified voltage $V_{RECT}$ 152 when MEASURE ENABLE signal 208 in waveform 308 is high.

FIG. 3A shows that timer 210 changes the MEASURE ENABLE signal from a low logic level L to a high logic level H during measurement intervals $T_P$ and $T_Z$. In various examples, the $T_P$ measurement intervals may be considered peak intervals of the ac input voltage $V_{AC}$ 102 at the input of the power converter. Measurement intervals $T_P$ (such as for example from time $t_2$ to time $t_4$, and from time $t_8$ to time $t_{10}$) occur near the times when the waveform 352 of rectified voltage $V_{RECT}$ 152 is at a peak value $V_P$ 305. In various examples, the $T_Z$ measurement intervals may be considered zero-crossing intervals of the ac input voltage $V_{AC}$ 102 at the input of the power converter. Measurement intervals $T_Z$ (such as for example from time $t_5$ to time $t_7$, and from time $t_{11}$ to time $t_{13}$) occur near the times when waveform 352 of rectified voltage $V_{RECT}$ 152 is zero. The times when the waveform 352 of rectified voltage $V_{RECT}$ 152 is zero correspond to the times when the ac input voltage $V_{AC}$ 102 crosses zero. As will be shown in various examples, the MEASURE ENABLE signal is coupled to enable the input sense circuit to sense the input of the power converter only during the peak $T_P$ and zero-crossing $T_Z$ measurement intervals in accordance with the teachings of the present invention. In the various examples, the MEASURE ENABLE signal is coupled to disable the input sense circuit from sensing the input of the power converter during intervals other than the peak $T_P$ and zero-crossing $T_Z$ measurement intervals in accordance with the teachings of the present invention. By disabling the input sense circuit from sensing the input of the power converter during intervals other than the peak $T_P$ and zero-crossing $T_Z$ measurement intervals, power consumption is reduced in accordance with the teachings of the present invention.

It is desirable for measurement intervals $T_P$ and $T_Z$ to be as near as possible to the peaks and zero-crossings respectively of the ac input voltage $V_{AC}$ 102. In the example of FIG. 3A, the measurement interval $T_P$ includes time before and time after the peak value of the ac input voltage $V_{AC}$ 102. Also in the example of FIG. 3A, the measurement interval $T_Z$ includes time before and time after the zero-crossing of the ac input voltage $V_{AC}$ 102. In one example, zero-crossing detector 216 may indicate the occurrence of a zero-crossing to timer 210 when current $I_{R1}$ 224 falls below a first zero-crossing threshold value and rises above a second zero-crossing threshold value within a specified window of time.

The timing diagram 300 of FIG. 3A shows a first wait interval $T_{W1}$ from time $t_1$ to time $t_2$, from time $t_7$ to time $t_8$, and from time $t_{13}$ to time $t_{14}$. First wait interval $T_{W1}$ begins at the end of measurement interval $T_Z$. The timing diagram 300 of FIG. 3A shows a second wait interval $T_{W2}$ from time $t_4$ to time $t_5$, and from time $t_{10}$ to time $t_{ii}$. Second wait interval $T_{W2}$ begins at the end of measurement interval $T_P$. There is no measurement of the ac input voltage $V_{AC}$ 102 during the wait intervals $T_{W1}$ and $T_{W2}$.

In one example, timer 210 may adjust wait intervals $T_{W1}$ and $T_{W2}$ along with measurement intervals $T_P$ and $T_Z$ according to the period $T_L$ of the ac input voltage $V_{AC}$ 102 so that measurements are taken in the shortest time for every frequency of the ac input voltage $V_{Ac}$ 102. In another example, the wait intervals and the measurement intervals may be fixed values that are large enough to cover the peaks and zero-crossings of the ac input voltage $V_{AC}$ 102 within a range of power line frequencies, such as for example from 47 Hz to 63 Hz.

Timing diagram 300 of FIG. 3A also shows the waveform 314 of COMPARE ENABLE signal 214 going from a low logic level L to a high logic level H during the peak measurement intervals $T_P$ to ensure that comparators 234 compare the buffered sense signal 232 to a reference value only when the ac input voltage $V_{AC}$ 102 is near a peak.

Figure 3B:
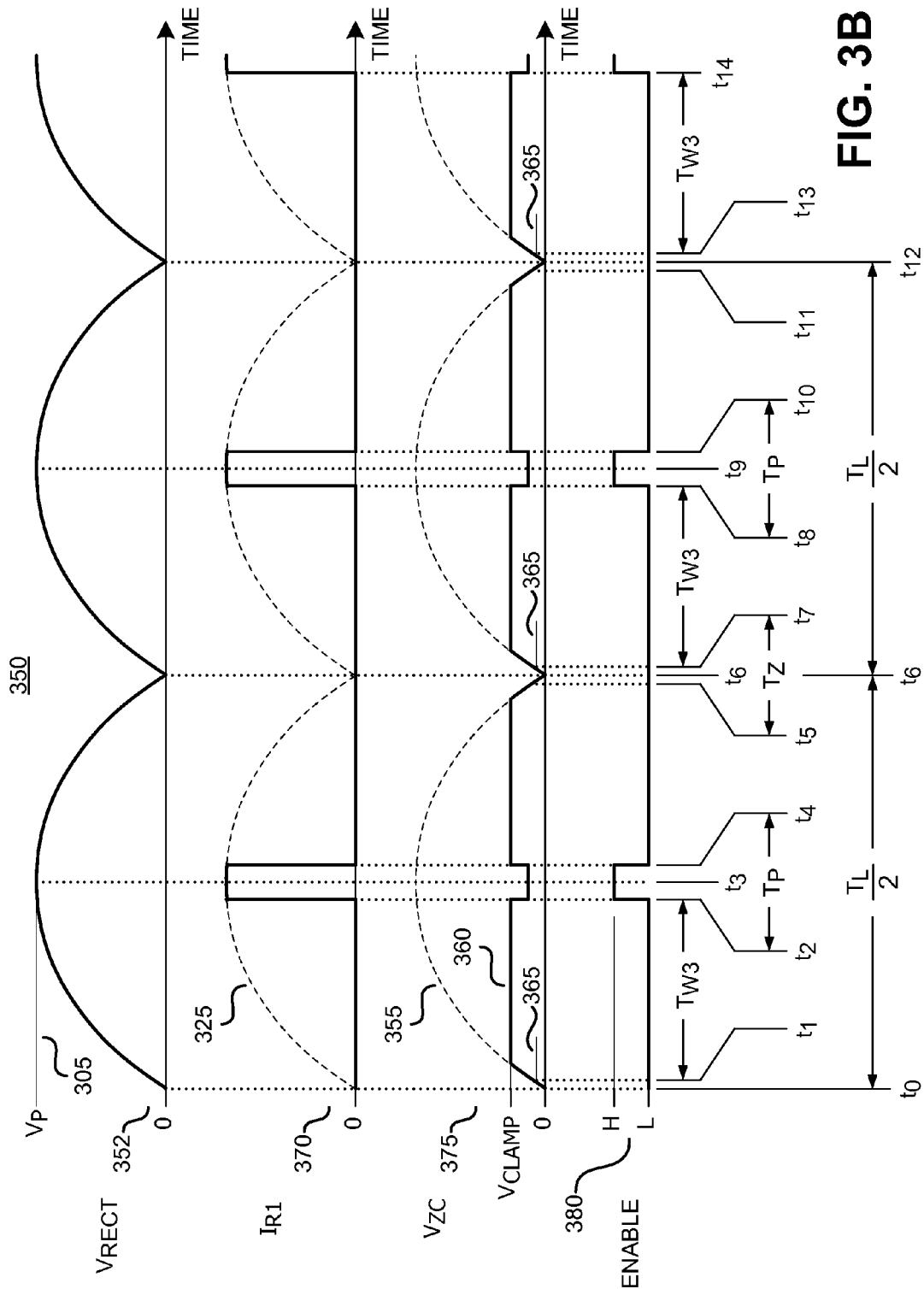
FIG. 3B is a timing diagram showing example waveforms that illustrate the operation of the alternative example ac voltage sensor with low power consumption shown in FIG. 2B in accordance with the teachings of the present invention.

FIG. 3B is a timing diagram 350 that shows example waveforms illustrating the operation of the alternative example ac voltage sensor with low power consumption shown in FIG. 2B as used in the example power converter of FIG. 1. Waveform 352 of the rectified voltage $V_{RECT}$ 152 from FIG. 3A is reproduced in FIG. 3B as a reference. Waveform 370 in FIG. 3B shows current $I_{R1}$ 224 following the envelope 325 only during peak measurement intervals $T_P$ because the alternative example ac voltage sensor of FIG. 2B does not require the line sense switch $Q_{LV}$ 222 to be ON for zero-crossing detector 246 to sense zero-crossings of the ac input $V_{AC}$ 102. Consistent with waveform 370, waveform 380 shows that ENABLE signal 209 goes from a logic low level L to a logic high level H only during peak measurement intervals $T_P$ in the example of FIG. 3B.

Waveform 375 in FIG. 3B shows the voltage $V_{ZC}$ 250 that is received by the zero-crossing detector 246 in the alternative example ac voltage sensor with low power consumption shown in FIG. 2B. Voltage $V_{ZC}$ 250 is shown in waveform 375 to follow the envelope 355 of the rectified voltage $V_{RECT}$ 152 until the rectified voltage $V_{RECT}$ 152 exceeds the magnitude of a clamp voltage $V_{CLAMP}$ 360. Voltage $V_{ZC}$ 250 remains at the clamp voltage $V_{CLAMP}$ 360 until either ENABLE signal 209 goes to a logic high level H turning line sense switch $Q_{LV}$ 222 ON, or the full wave rectified voltage $V_{RECT}$ 152 falls below the clamp voltage $V_{CLAMP}$ 360. Since voltage $V_{ZC}$ 250 will always cross a zero-crossing threshold 365 between zero and the clamp voltage $V_{CLAMP}$ 360 at least once in every ac line period $T_L$, only one timed wait interval $T_{W3}$ is required.

An interval $T_Z$ may be measured that starts from a time $t_5$ when the voltage $V_{ZC}$ 250 falls below a first zero-crossing threshold that comes before a zero-crossing of the ac input voltage $V_{AC}$ 102 at a time $t_6$ to a time $t_7$ when the voltage $V_{ZC}$ 250 rises above a second zero-crossing threshold that comes after the zero-crossing of the ac input voltage $V_{AC}$ 102. In one example, the first zero-crossing threshold may be substantially equal to the second zero-crossing threshold. It is necessary to time the interval from the time that $V_{ZC}$ 250 crosses a threshold near zero, preferably the second zero-crossing threshold, to the start of the peak measurement interval $T_P$, such as for example from time $t_1$ to $t_2$, from time $t_7$ to $t_8$, and from time $t_{13}$ to $t_{14}$ in FIG. 3B.

Figure 4:
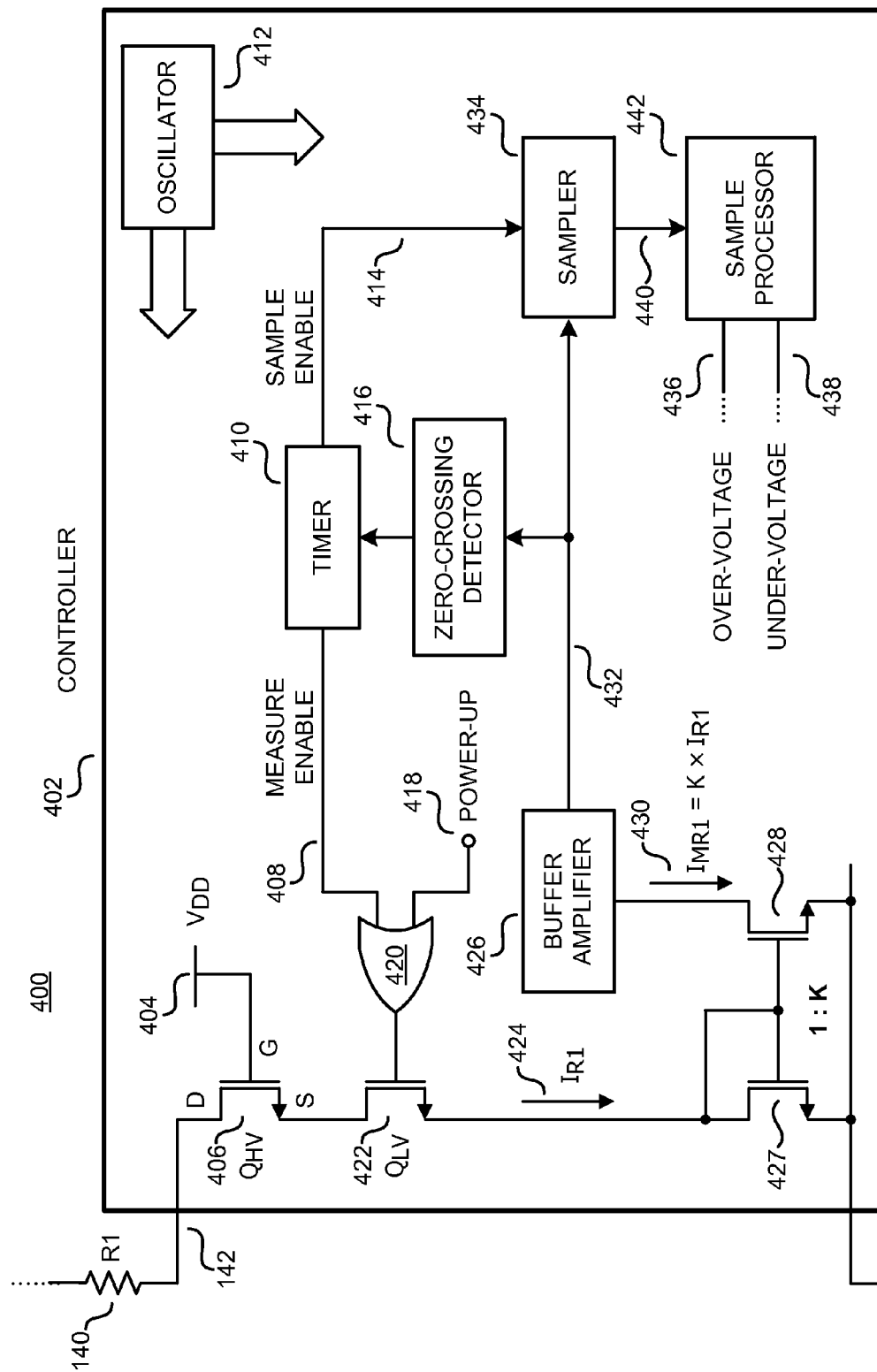
FIG. 4 is a functional block diagram of another example power converter controller illustrating elements of an alternative ac voltage sensor with low power consumption in accordance with the teachings of the present invention.

FIG. 4 is a functional block diagram 400 of another example controller 402 illustrating an ac voltage sensor with low power consumption that combines elements of the examples in FIG. 2A and FIG. 2B in accordance with the teachings of the present invention. The example of FIG. 4 includes a high voltage transistor $Q_{HV}$ 406 and a low voltage transistor $Q_{LV}$ 422 similar to respective transistors 204 and 222 of FIG. 2B. The example of FIG. 4 also includes OR gate 420 receiving MEASURE ENABLE signal 408 and POWER-UP signal 418 similar to the example of FIG. 2A. In the example of FIG. 4, current $I_{R1}$ 424 is received by a transistor 427 and is mirrored by a transistor 428 to a scaled current $I_{MR1}$ 430 similar to the examples of FIG. 2A, FIG. 2B, and FIG. 2C. Mirrored current $I_{MR1}$ 430 is processed by a buffer amplifier 426 as in examples FIG. 2A, FIG. 2B and FIG. 2C.

Buffer amplifier 426 in the example of FIG. 4 produces a buffered sense signal 432 that is received by a zero-crossing detector 416 as in the example of FIG. 2A. The example of FIG. 4 replaces the comparators 234 in the examples of FIG. 2A, FIG. 2B, and FIG. 2C with a sampler 434 and a sample processor 442 that may assert either an OVER-VOLTAGE signal 436 or an UNDER-VOLTAGE signal 438. As will be explained later by the waveforms of FIG. 5, the introduction of the sampling feature in the example of FIG. 4 may allow measurement of the ac input voltage $V_{AC}$ 102 near the expected peak with less power consumption than in the examples of FIG. 2A, FIG. 2B, and FIG. 2C.

Sample processor 442 may analyze the samples in various ways to determine when it is appropriate to indicate with OVER-VOLTAGE signal 436 or UNDER-VOLTAGE signal 438 that the ac input voltage $V_{AC}$ 102 is either too high or too low for proper operation of the power converter. In one example, sample processor 442 may take an average of the sampled values, and compare the average to a threshold. In another example, sample processor 442 may look for a sequence of increasing and decreasing values, take the highest value in the sequence, and compare the highest value to a threshold. In yet another example, sample processor 442 may adjust the timing of timer 410 to include the peak within the range of the sampling times if the samples do not indicate that the sampling occurs before and after the peak of the ac input voltage $V_{AC}$ 102.

The COMPARE ENABLE signal 214 in FIG. 2A and the ENABLE signal 209 in FIG. 2B are replaced in FIG. 4 by a SAMPLE ENABLE signal 414 from timer 410. Optional oscillator 412 in FIG. 4 provides timing and synchronization signals similar to oscillator 212 in the examples of FIG. 2A, FIG. 2B, and FIG. 2C.

Figure 5:
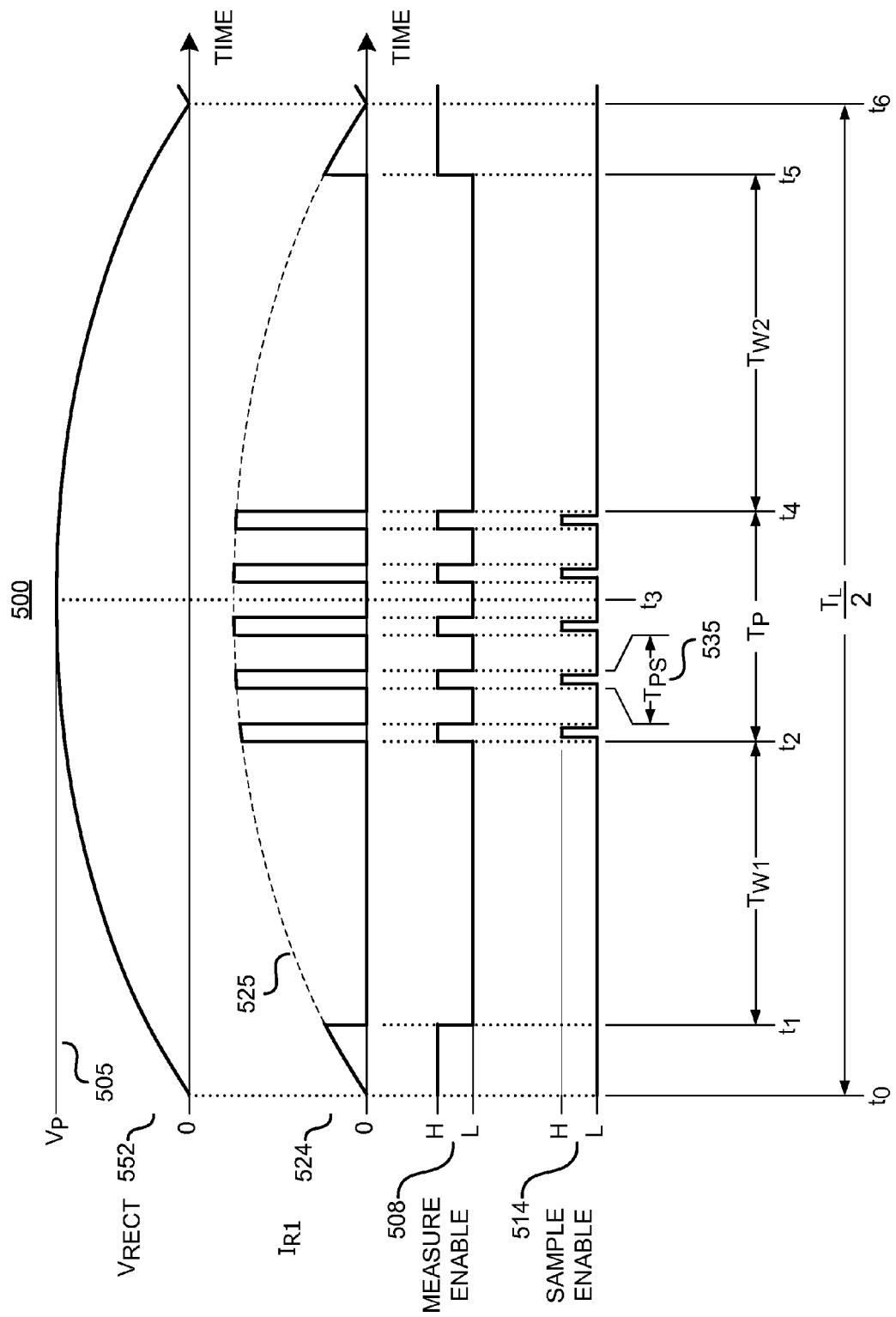
FIG. 5 is a timing diagram showing example waveforms that illustrate the operation of the example ac voltage sensor with low power consumption shown in FIG. 4 in accordance with the teachings of the present invention.

FIG. 5 is a timing diagram 500 showing example waveforms that illustrate the operation of the example ac voltage sensor with low power consumption shown in FIG. 4 as used in the example power converter of FIG. 1. As in the example waveforms of FIG. 3A, the example waveforms of FIG. 5 are for steady-state conditions after transient disturbances from the application of ac input voltage $V_{AC}$ 102 have decayed to negligible values, and when the POWER-UP signal 418 is at a logic low level.

Waveform 552 in the example of FIG. 5 represents the rectified voltage $V_{RECT}$ 152 for one half-period of the ac input voltage $V_{AC}$ 102 from a zero-crossing at time $t_0$ to a zero-crossing at time $t_6$. Waveform 552 in FIG. 5 shows that rectified voltage $V_{RECT}$ 152 reaches a peak value $V_P$ 505 at time $t_3$. The span of time illustrated in FIG. 5 covers only a half-period of the ac input voltage $V_{AC}$ 102 to provide more detail of the signals in the vicinity of the peak value at time $t_3$ within the interval $T_P$.

Waveform 508 in FIG. 5 shows that MEASURE ENABLE signal 408 in the example of FIG. 4 is at a logic high level H from time $t_0$ to time $t_1$, from time $t_5$ to time $t_6$, and at multiple times within the interval $T_P$ between time $t_2$ and time $t_4$. The multiple instances of high and low logic levels within the interval $T_P$ are in contrast to the example waveform 308 in FIG. 3A that shows MEASURE ENABLE signal 208 at a logic high level for the entire interval $T_P$ between time $t_2$ and time $t_4$. Waveform 508 in FIG. 5 also shows that MEASURE ENABLE signal 408 in the example of FIG. 4 is at a logic low level L during a first wait interval $T_{W1}$ between time $t_1$ and $t_2$, and at a logic low level L again during a second wait interval $T_{W2}$ between time $t_4$ and time $t_5$, similar to MEASURE ENABLE signal 208 in the example waveform 308 of FIG. 3A.

The timing diagram 500 of FIG. 5 shows that high voltage transistor $Q_{HV}$ 406 is ON when MEASURE ENABLE signal 408 in waveform 508 is high, allowing input voltage sense terminal 142 to receive current $I_{R1}$ 424 as shown in waveform 524. Since the current $I_{R1}$ 424 is proportional to the reciprocal of the resistance of input sensing resistor $R_1$ 140 when high voltage transistor $Q_{HV}$ 406 is ON, waveform 524 in FIG. 5 shows that current $I_{R1}$ 424 follows the envelope 525, which is proportional to waveform 552 of rectified voltage $V_{RECT}$ 152 when MEASURE ENABLE signal 408 is high, similar to the example illustrated in FIG. 3A.

The timing diagram 500 of FIG. 5 shows multiple instances of MEASURE ENABLE signal 408 in waveform 508 going from a low logic level L to a high logic level H within an interval $T_P$ from time $t_2$ to time $t_4$ near the peak value $V_P$ 505 of the rectified voltage $V_{RECT}$ 152 that occurs at time $t_3$. Time $t_2$ comes before time $t_3$ and time $t_4$ comes after time $t_3$. SAMPLE ENABLE signal 414 as shown in waveform 514 in the timing diagram of FIG. 5 goes high for a sampling interval $T_{PS}$ 535 when MEASURE ENABLE signal 408 in waveform 508 is high within the interval $T_P$. Sampler 434 in the example controller of FIG. 4 takes values of buffered sense signal 432 when SAMPLE ENABLE signal 414 is at a high logic level H.

The timing diagram 500 of FIG. 5 illustrates that values of buffered sense signal 432 are sampled by sampler 434 before and after the peak of the rectified voltage $V_{RECT}$ 152. The timing diagram 500 of FIG. 5 also illustrates that values of buffered sense signal 432 are not necessarily sampled at the peak value that occurs at time $t_3$. Use of the sampling feature illustrated in FIG. 5 may allow measurement of the ac input voltage $V_{AC}$ 102 near the expected peak with less power consumption than the continuous measurement illustrated in the examples of FIG. 2A, FIG. 2B, and FIG. 2C. The number of samples acquired within the interval $T_P$ from time $t_2$ to $t_4$ need not be the same number for each half-period of the ac input voltage $V_{AC}$ 102. Also, each of the wait intervals $T_{W1}$ and $T_{W2}$ may have a different value in different half-periods of the ac input voltage $V_{AC}$ 102. For example, of the five consecutive samples illustrated in FIG. 5, the samples in the first, third and fifth positions may be acquired in one half-period, and the samples in the remaining second and fourth positions may be acquired in the next half-period. In an example that acquires the same number of samples in each half-period, samples may be acquired after a first wait interval $T_{W1}$ that has a first value in one half-period, and in the next half-period samples may be acquired after a first wait interval $T_{W1}$ that has a second value different from the first value. A reduction in the number of samples acquired during each half-period may reduce the power consumed by sampling. The use of different wait interval may increase the likelihood of acquiring a sample at the peak of the ac input voltage.

Figure 6:
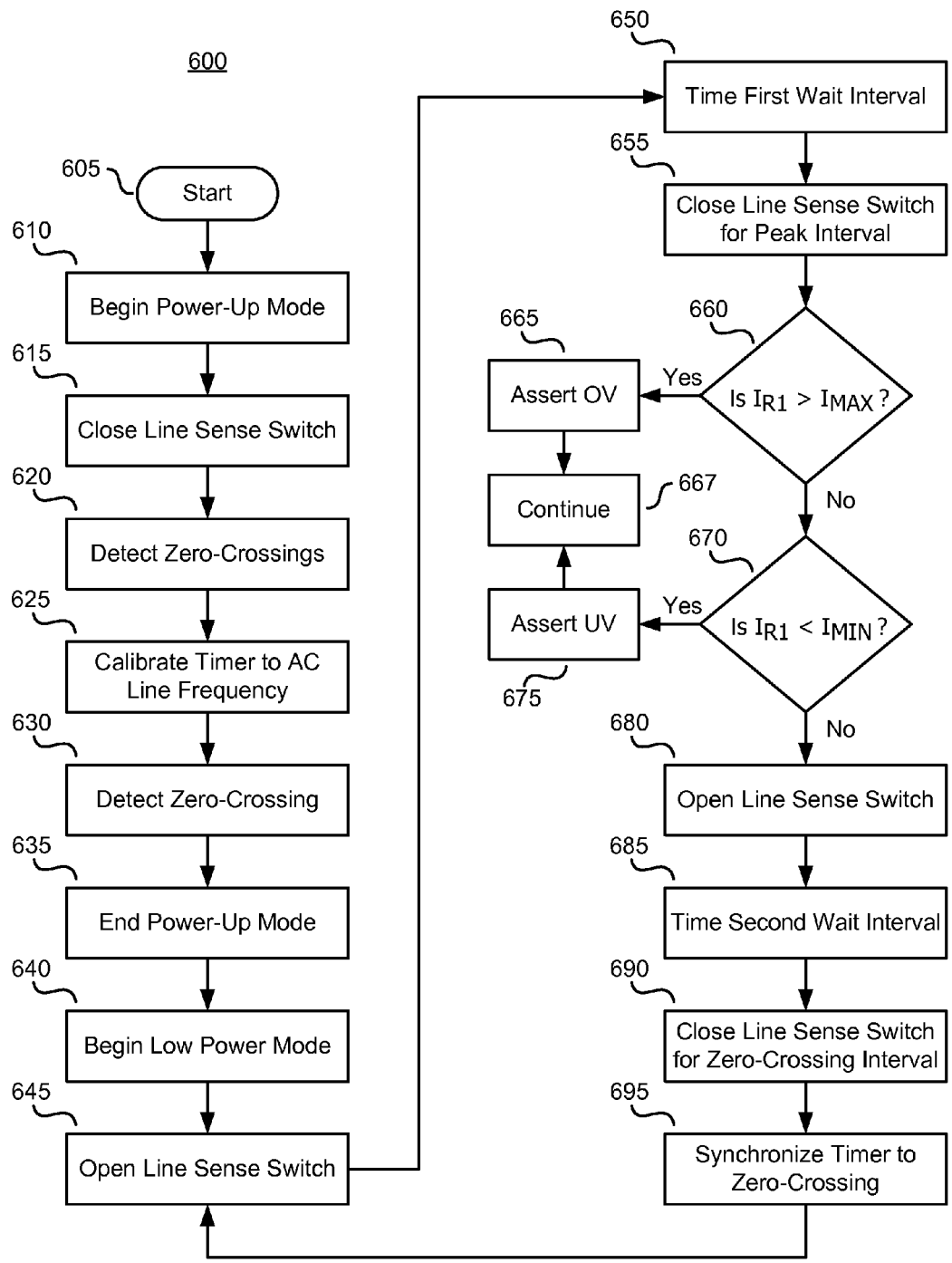
FIG. 6 is a flow diagram that illustrates an example process for sensing an ac voltage with low power consumption and detecting over-voltage and under-voltage conditions in accordance with teachings of the present invention.

FIG. 6 is a flow diagram 600 that illustrates an example process for a power converter controller that senses an ac input voltage with low power consumption and detects conditions of over-voltage and under-voltage in accordance with the teachings of the present invention. The example flow diagram of FIG. 6 is consistent with the example controller of FIG. 2A and with the example waveforms of FIG. 3A. After starting in block 605 with ac input voltage applied to the power converter, the controller enters a power-up mode in block 610. The controller closes a line sense switch in block 615 to allow the controller to receive current from the ac input voltage for several periods of the ac input voltage.

After the line sense switch closes in block 615, the controller detects the times when the current received from the ac input voltage goes to a value near zero in block 620, and uses the information in block 625 to discover the frequency of the ac input voltage and to calibrate the timer to the frequency of the ac input voltage. After the timer is calibrated to the frequency of the ac input voltage, the controller again deduces the time of a zero-crossing in block 630 to synchronize the timer with the zero-crossings of the ac input voltage. Once the timer is calibrated and synchronized with the ac input voltage, the controller ends the power-up mode in block 635, begins the low power mode in block 640 after a zero-crossing interval, and opens the line sense switch in block 645 to stop receiving current from the ac input voltage.

After the line sense switch opens in block 645, the timer times a first wait interval in block 650. At the end of the first wait interval, the controller closes the line sense switch in block 655 for an interval that includes a peak of the ac input voltage.

While the line sense switch is closed during the peak interval, the controller receives current that is proportional to the ac input voltage from the ac input voltage. In block 660 the controller compares the current from the ac input voltage to a maximum threshold value. If the current from the ac input voltage is greater than the maximum threshold value, the controller asserts an over-voltage signal in block 655. If the current from the ac input voltage is not greater than the maximum threshold value, the controller compares the current from the ac input voltage to a minimum threshold value in block 670. If the current from the ac input voltage is less than the minimum threshold value, the controller asserts an under-voltage signal in block 675. After assertion of either an over-voltage signal in block 655 or an under-voltage signal in block 675, the controller continues operation in block 667 with a designated response to the over-voltage or the under-voltage condition. If the current from the ac input voltage is neither greater than the maximum threshold value nor less than the minimum threshold value, the flow continues to block 680 where the controller opens the line sense switch to stop receiving current from the ac input voltage.

After the line sense switch opens in block 680, the timer times a second wait interval in block 685. At the end of the second wait interval, the controller closes the line sense switch for in block 690 for an interval that includes a zero-crossing of the ac input voltage. The controller receives current from the ac input voltage while the line sense switch is closed, and the timer is again synchronized to the zero-crossing of the ac input voltage in block 695. The flow continues to block 645 where the line sense switch is opened to stop the controller from receiving current form the ac input voltage.

Figure 7:
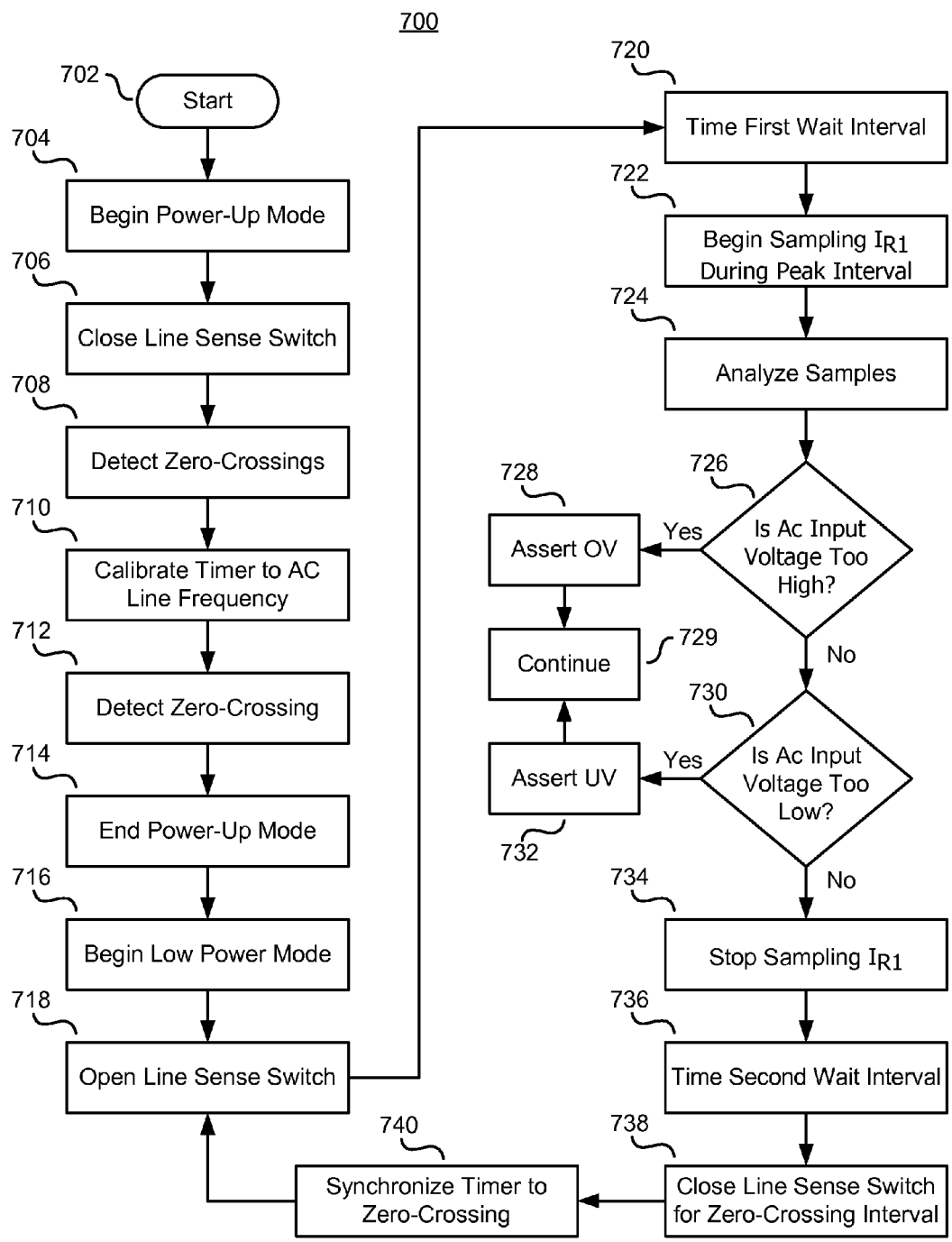
FIG. 7 is a flow diagram that illustrates a variant of the example process of FIG. 6 for sensing an ac voltage with low power consumption and detecting over-voltage and under-voltage conditions in accordance with the teachings of the present invention.

FIG. 7 is flow diagram 700 that illustrates a variant of the example process of FIG. 6 for sensing an ac voltage with low power consumption and detecting over-voltage and under-voltage conditions in accordance with the teachings of the present invention. The example flow diagram of FIG. 7 is consistent with the example controller of FIG. 4 and with the example waveforms of FIG. 5. After starting in block 702 with ac input voltage applied to the power converter, the controller enters a power-up mode in block 704. The controller closes a line sense switch in block 706 to allow the controller to receive current from the ac input voltage for several periods of the ac voltage.

After the line sense switch closes in block 706, the controller detects the times when the current received from the ac input voltage goes to a value near zero in block 708, and uses the information in block 710 to discover the frequency of the ac input voltage and to calibrate the timer to the frequency of the ac input voltage. After the timer is calibrated to the frequency of the ac input voltage, the controller again deduces a zero-crossing in block 712 to synchronize the timer with the zero-crossings of the ac input voltage. Once the timer is calibrated and synchronized with the ac input voltage, the controller ends the power-up mode in block 714, begins the low power mode in block 716 after a zero crossing interval, and opens the line sense switch in block 718 to stop receiving current from the ac input voltage.

After the line sense switch opens in block 718, the timer times a first wait interval in block 720. At the end of the first wait interval, the controller begins to obtain samples of current from the ac input voltage by opening and closing the line sense switch in block 722 for an interval that includes a peak of the ac input voltage. The controller receives a sample of current that is proportional to the ac input voltage from the ac input voltage when the line sense switch is closed during the peak interval. The controller analyzes the samples in block 724.

The analysis of the samples from block 724 is compared to a maximum threshold value in block 726. If the result of the analysis of samples is greater than the maximum threshold value, the controller asserts an over-voltage signal in block 728. If the result of the analysis of samples is not greater than the maximum threshold value, the controller compares the result of the analysis of samples to a minimum threshold value in block 730. If the result of the analysis of samples is less than the minimum threshold value, the controller asserts an under-voltage signal in block 732. After assertion of either an over-voltage signal in block 728 or an under-voltage signal in block 732, the controller continues operation in block 729 with a designated response to the over-voltage or the under-voltage condition. If the result of the analysis of samples is neither greater than the maximum threshold value nor less than the minimum threshold value, the flow continues to block 734 where the sampling ends and the controller opens the line sense switch to stop receiving current from the ac input voltage.

After the line sense switch opens in block 734, the timer times a second wait interval in block 736. At the end of the second wait interval, the controller closes the line sense switch in block 738 for an interval that includes a zero-crossing of the ac input voltage. The controller receives current from the ac input voltage while the line sense switch is closed, and the timer is again synchronized to the zero-crossing of the ac input voltage in block 740. The flow continues to block 718 where the line sense switch is opened to stop the controller from receiving current form the ac input voltage.

Since the ac input voltage sensor with low power consumption receives current from the ac input voltage $V_{AC}$ 102 only during a portion of the ac line period near the peak of the ac voltage, a potentially damaging high input voltage could be undetected if it were to occur during the time when the sensor is not receiving current. To prevent damage from a high voltage that may occur when the sensor is not receiving current from the ac input voltage $V_{AC}$ 102, the controller may sense the input voltage indirectly with low power consumption as a switching voltage at an output winding of the power converter.

Figure 8:
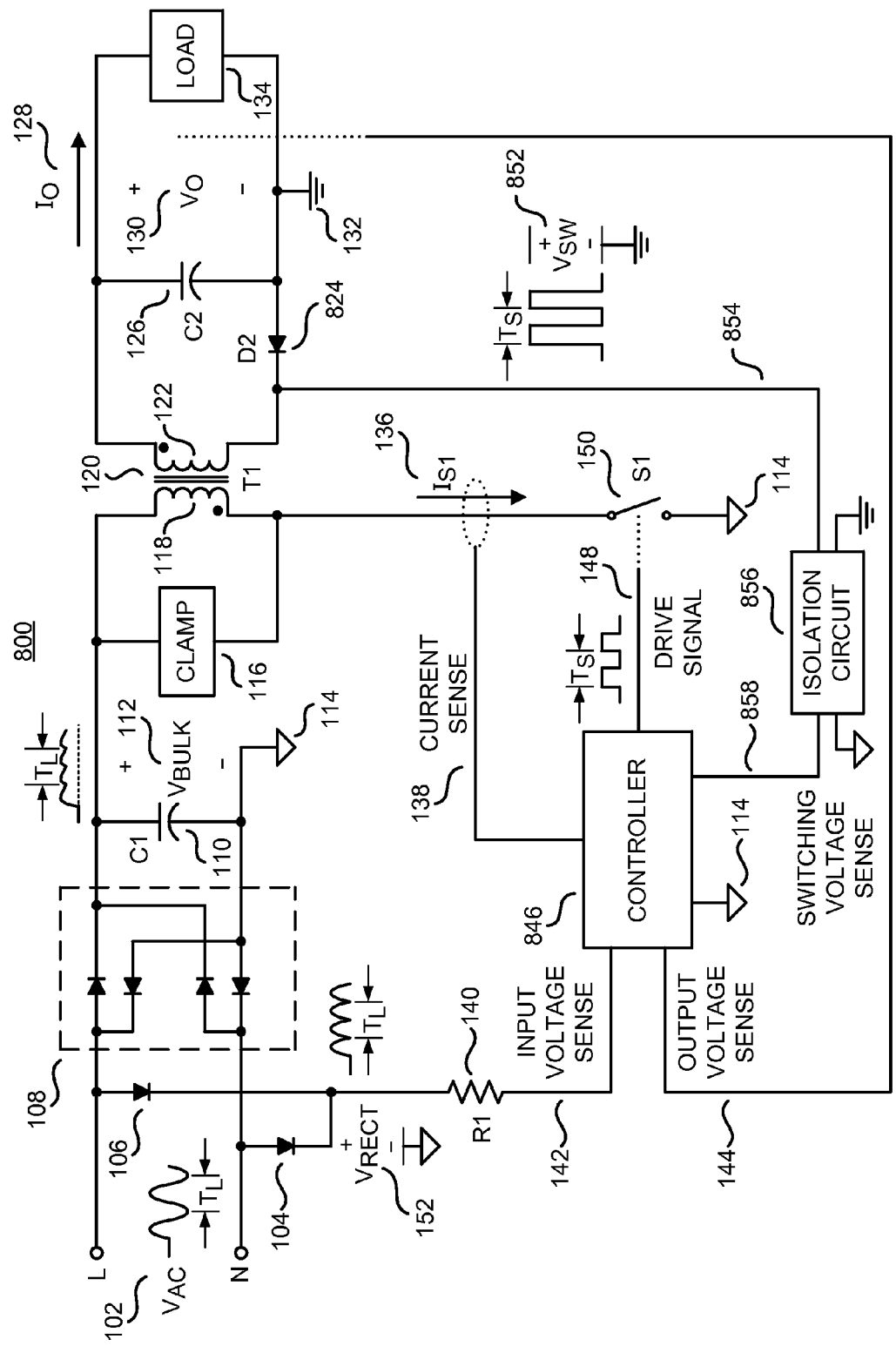
FIG. 8 is a schematic diagram of an example power converter including a controller that senses a switching voltage representative of an ac input voltage with low power consumption in addition to sensing an ac input voltage with low power consumption in accordance with the teachings of the present invention.

FIG. 8 is a schematic diagram 800 of an example power converter including a controller that senses a switching voltage $V_{SW}$ 852 that is representative of an ac input voltage in addition to sensing an ac input voltage with low power consumption in accordance with the teachings of the present invention. Since the maximum value of the bulk voltage $V_{BULK}$ 112 is approximately the peak magnitude of the ac input voltage $V_{AC}$ 102, the maximum of the ac input voltage $V_{AC}$ 102 may be sensed as a maximum of the bulk voltage $V_{BULK}$ 112. A switching voltage $V_{SW}$ 852 that is proportional to the bulk voltage $V_{BULK}$ 112 is available at the output winding 122 of the example power converter of FIG. 8. Since the magnitude of the switching voltage $V_{SW}$ 852 is substantially lower voltage than the peak of the ac input voltage $V_{AC}$ 102, the controller may sense the switching voltage $V_{SW}$ 852 with low power consumption.

The example power converter of FIG. 8 is obtained from the example of FIG. 1 by relocating output diode D1 124 of FIG. 1 to the position of output diode D2 824 of FIG. 8, and by receiving the switching voltage $V_{SW}$ 852 with a modified controller 846. An isolation circuit 856 provides galvanic isolation between the input return 114 and the output return 132 such that the switching voltage sense signal 858 is galvanically isolated from the switching voltage signal 854. In one example, isolation circuit 856 may be an optocoupler. In another example, isolation circuit 856 may include a transformer. With the modifications illustrated in FIG. 8, the modified controller 846 may detect an input over-voltage condition even when the controller is not receiving current from the ac input voltage $V_{AC}$ 102. It is appreciated that in other examples, a switching voltage signal analogous to switching voltage $V_{SW}$ 852 could be obtained from a separate winding other than the output winding 122 shown in FIG. 8 while still benefiting from the teachings of the present invention.

Every conductor in an electrical circuit has a finite parasitic capacitance that may store an electric charge. Leakage currents in typical applications usually discharge the parasitic capacitance fast enough to make the effects of the parasitic capacitance negligible. In applications where the effects of parasitic capacitance are not negligible, relatively small modifications to the example circuits may allow those applications to benefit from the ac voltage sensor with low power consumption in accordance with the teachings of the present invention. It is appreciated that the effects of parasitic elements such as capacitance and conduction periods of input bridge rectifiers such as bridge rectifier 108 may influence the exact timing of zero crossing signals or peak input voltage signals while still benefiting from the teachings of the present invention.

Figure 9:
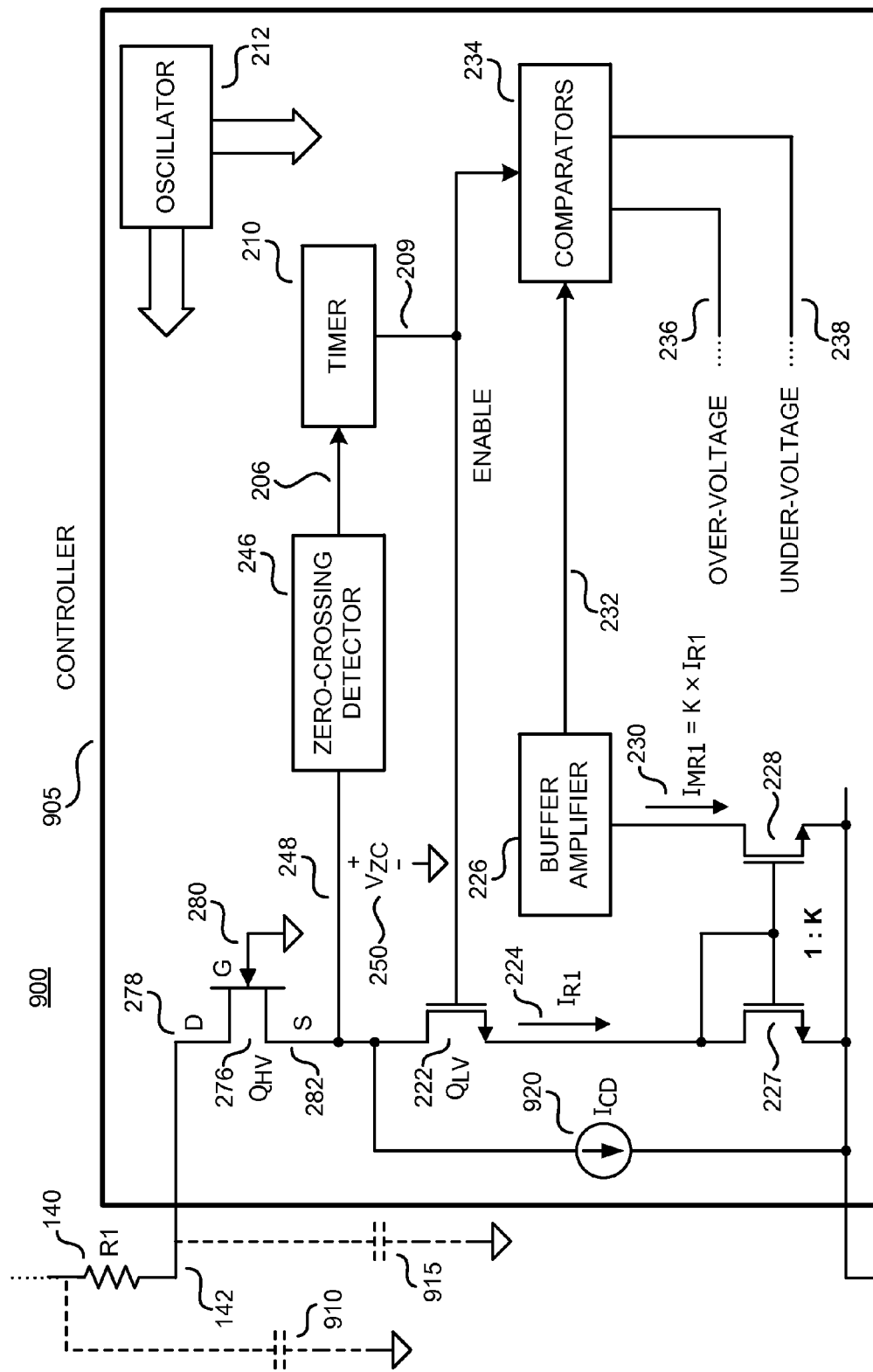
FIG. 9 is a functional block diagram of an example power converter controller illustrating parasitic capacitance and a discharging current source.

FIG. 9 shows a functional block diagram 900 of a power converter controller 905 including a current source $I_{CD}$ 920 that provides current to discharge parasitic capacitance 910 and parasitic capacitance 915 at each end of the input sensing resistor R1 140. As shown in the depicted example, the current source $I_{CD}$ 920 is coupled to the low voltage line sense switch $Q_{LV}$ 222. Since the example controller of FIG. 9 does not close the line sense switch $Q_{LV}$ 222 during a zero-crossing interval to discharge parasitic capacitance 910 and parasitic capacitance 915, the voltage at voltage sense terminal 142 may not go to zero at the zero-crossings of ac input voltage $V_{AC}$ 102 without the current from current source $I_{CD}$ 920 to discharge the parasitic capacitance. Thus in the depicted example, current source $I_{CD}$ 920 is coupled to discharge the parasitic capacitance 910 and parasitic capacitance 915 when the line sense switch $Q_{LV}$ 222 is open.

The current required to discharge the parasitic capacitance in less than a half-period of the ac input voltage is typically not high enough to consume significant power. In one example, the current from current source $I_{CD}$ 920 is less than 2 microamperes.

Figure 10:
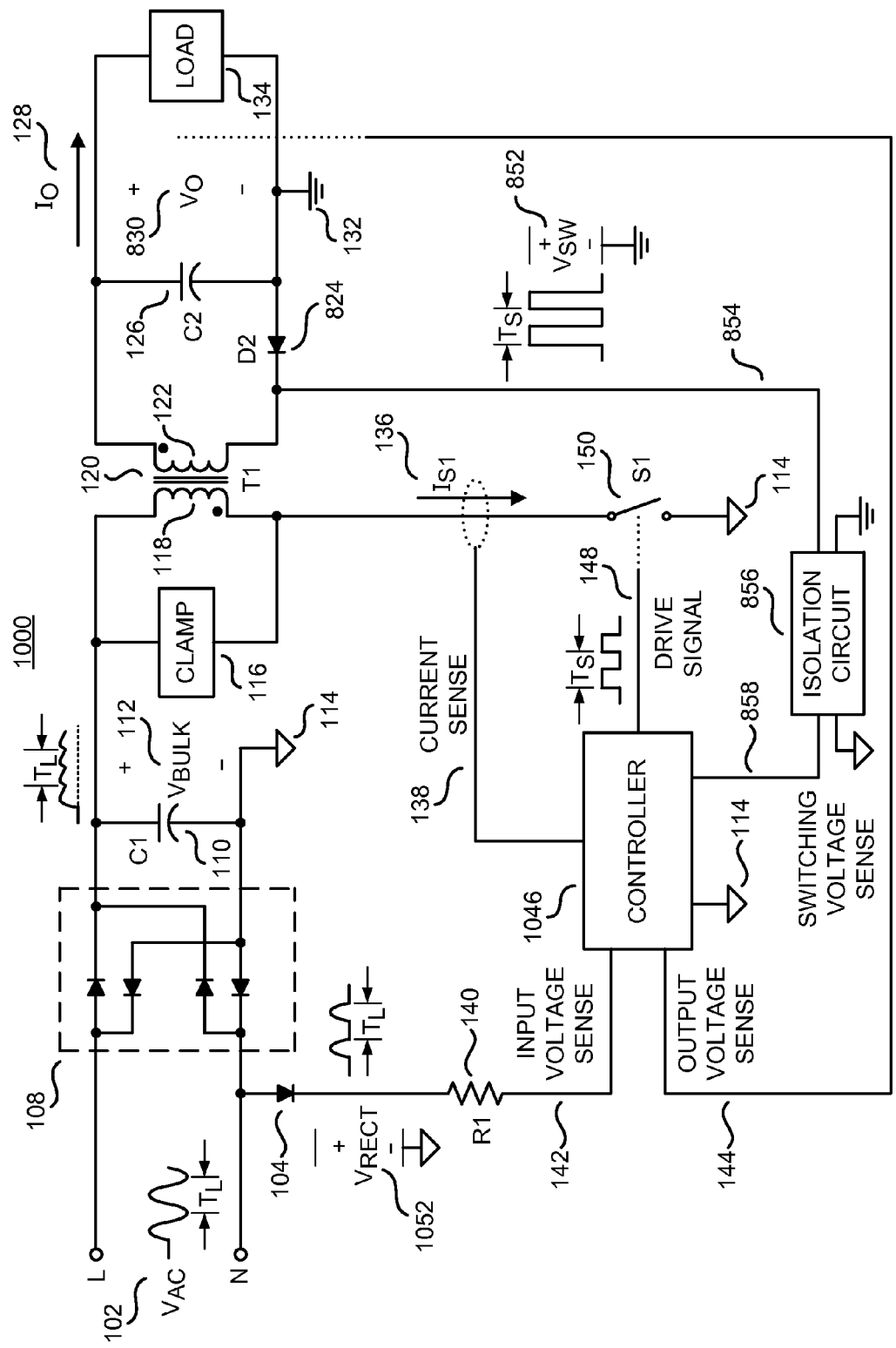
FIG. 10 is a schematic diagram of an example power converter that shows an alternative circuit and controller that senses an ac input voltage with low power consumption in accordance with the teachings of the present invention.

FIG. 10 is a schematic diagram 1000 of an example power converter that shows an alternative circuit and controller that senses an ac input voltage with low power consumption in accordance with the teachings of the present invention. The alternative circuit example of FIG. 10 may be useful in applications where the effects of stray capacitance at the ends of input sensing resistor R1 140 are not negligible. The alternative circuit example of FIG. 10 may also further reduce power the consumption of the ac voltage sensor in applications where stray capacitance is not a concern.

The example power converter of FIG. 10 is obtained from the example of FIG. 8 by removing diode 106 from FIG. 8, and by replacing controller 846 with a modified controller 1046. With the modifications illustrated in FIG. 10, the rectified voltage $V_{RECT}$ 152 that is a full-wave rectified voltage in the example of FIG. 8 becomes a half-wave rectified voltage $V_{RECT}$ 1052 in the example of FIG. 10. The full-wave rectified voltage $V_{RECT}$ 152 in the example of FIG. 8 reaches its peak value twice in every line period $T_L$, whereas the half-wave rectified voltage $V_{RECT}$ 1052 in the example of FIG. 10 reaches its peak value only once in every line period $T_L$. The additional time between peaks may allow the stray capacitance to discharge to zero volts between peak values of the ac input voltage $V_{AC}$ 102, as illustrated in FIG. 11.

Figure 11:
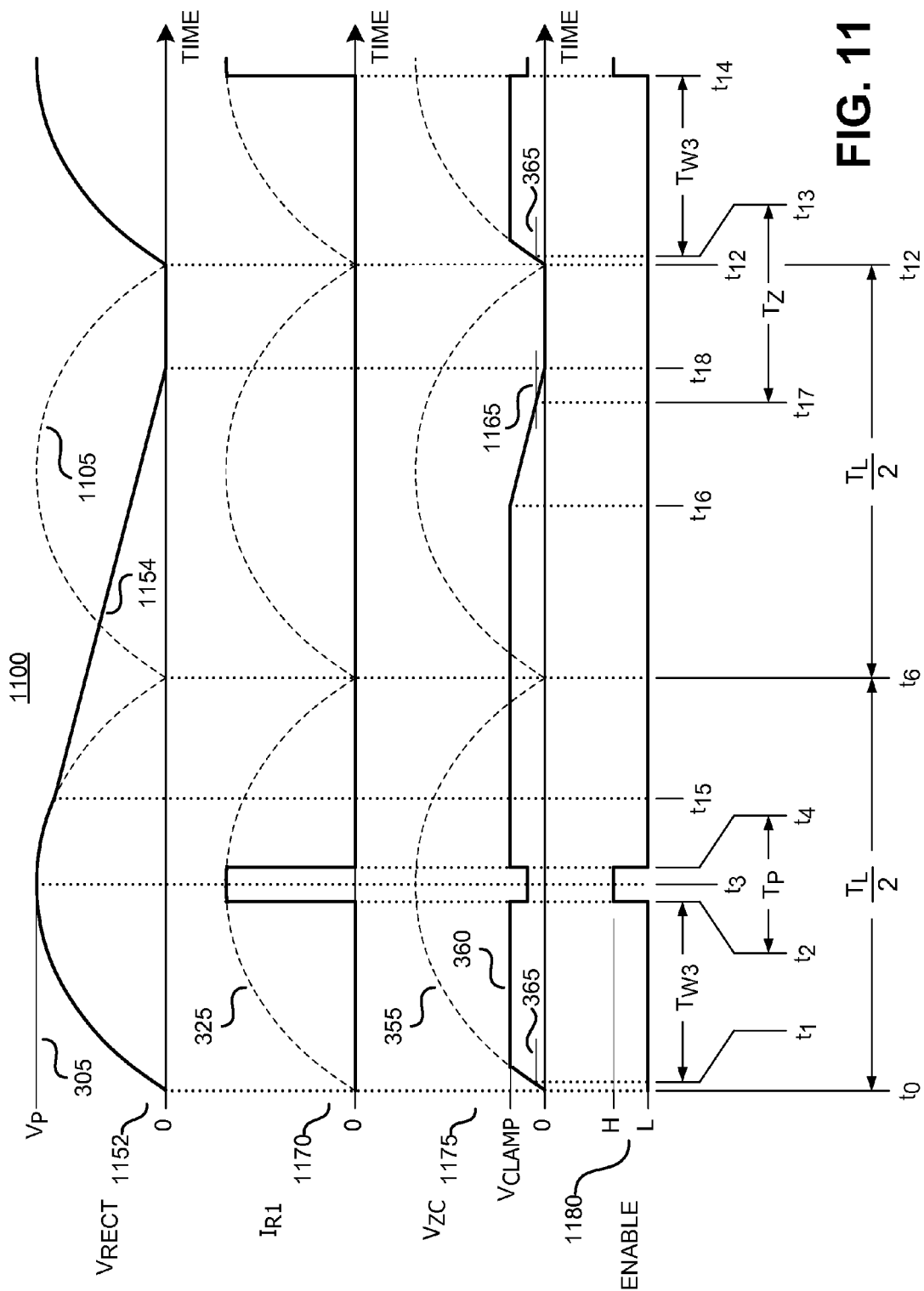
FIG. 11 is a timing diagram showing example waveforms that illustrate the operation of the alternative circuit and controller of FIG. 10 that senses an ac voltage with low power consumption in accordance with the teachings of the present invention.

FIG. 11 is a timing diagram 1100 showing example waveforms that illustrate the operation of the alternative circuit and controller of FIG. 10 that senses an ac voltage with low power consumption in accordance with the teachings of the present invention. The example power converter of FIG. 10 uses a controller with the features shown in FIG. 9. The controller in FIG. 9 has many similarities to the controller in FIG. 2C, whose operation is illustrated by the waveforms in FIG. 3B. As such, the waveforms in FIG. 11 have many similarities to the waveforms in FIG. 3B.

FIG. 11 shows waveform 1152 of the half-wave rectified voltage $V_{RECT}$ 1052 from FIG. 10 with the effect of parasitic capacitance 910 and 915 at the ends of current limiting resistor R1 140. The envelope 1105 of a full-wave rectified ac input voltage is provided in FIG. 11 as a reference. Rectified voltage $V_{RECT}$ 1052 represented by waveform 1152 in the example of FIG. 11 follows the envelope 1105 of the ac input voltage from a value of zero at time $t_0$ until the instantaneous value of the ac input voltage falls below the voltage on the parasitic capacitance 910 at time $t_{15}$. Current source $I_{CD}$ 920 in the controller of FIG. 9 discharges the parasitic capacitance until the rectified voltage $V_{RECT}$ 1052 represented by waveform 1152 reaches zero at time $t_{18}$. A substantially linear portion 1154 of waveform 1152 indicates the discharge of the parasitic capacitance by current source $I_{CD}$ 920.

Waveform 1170 in FIG. 11 shows current $I_{R1}$ 224 following the envelope 325 of a full-wave rectified ac input voltage during a peak measurement interval $T_P$ that occurs only once during an ac line period $T_L$. Consistent with waveform 1170, waveform 1180 shows that ENABLE signal 209 in FIG. 9 goes from a logic low level L to a logic high level H only during a peak measurement interval $T_P$.

Waveform 1175 in FIG. 11 shows the voltage $V_{ZC}$ 250 that is received by the zero-crossing detector 246 in the alternative example ac voltage sensor with low power consumption shown in FIG. 9. Voltage $V_{ZC}$ 250 is shown in waveform 1175 to follow the envelope 355 of the rectified voltage $V_{RECT}$ 1052 until the rectified voltage $V_{RECT}$ 1052 exceeds the magnitude of a clamp voltage $V_{CLAMP}$ 360. In one example $V_{CLAMP}$ could be a voltage clamp level set within the zero-crossing detector 246 in FIG. 9. Voltage $V_{ZC}$ 250 remains at the clamp voltage $V_{CLAMP}$ 360 until either ENABLE signal 209 in FIG. 9 goes to a logic high level H turning line sense switch $Q_{LV}$ 222 ON, or the rectified voltage $V_{RECT}$ 1052 falls below the clamp voltage $V_{CLAMP}$ 360 at time $t_{16}$.

Since voltage $V_{ZC}$ 250 will always cross a first zero-crossing threshold 1165 and a second zero-crossing threshold 365 between zero and the clamp voltage $V_{CLAMP}$ 360 in every ac line period $T_L$ before the ac input voltage $V_{AC}$ 102 reaches a peak, only one timed wait interval $T_{W3}$ is required as in the example of FIG. 3B.

An interval $T_Z$ may be measured starting from a time $t_{17}$ when the voltage $V_{ZC}$ 250 falls below the first zero-crossing threshold that comes after a peak of the ac input voltage $V_{AC}$ to a time $t_{13}$ when the voltage $V_{ZC}$ 250 rises above a second zero-crossing threshold that comes after the zero-crossing of the ac input voltage $V_{AC}$ 102. In one example, the controller in FIG. 9 may adjust current source $I_{CD}$ 920 to obtain a minimum value of the interval $T_Z$, thus allowing zero-crossing event timing at times $t_0$ and $t_{12}$ for example. As in the example of FIG. 3B where the effects of parasitic capacitance are negligible, it is necessary for the timer to time the interval $T_{W3}$ that goes from the time that $V_{ZC}$ 250 crosses the second zero-crossing threshold to the start of the peak measurement interval $T_P$, such as for example from time $t_1$ to $t_2$, and from time $t_{13}$ to $t_{14}$ in FIG. 11.

Figure 12:
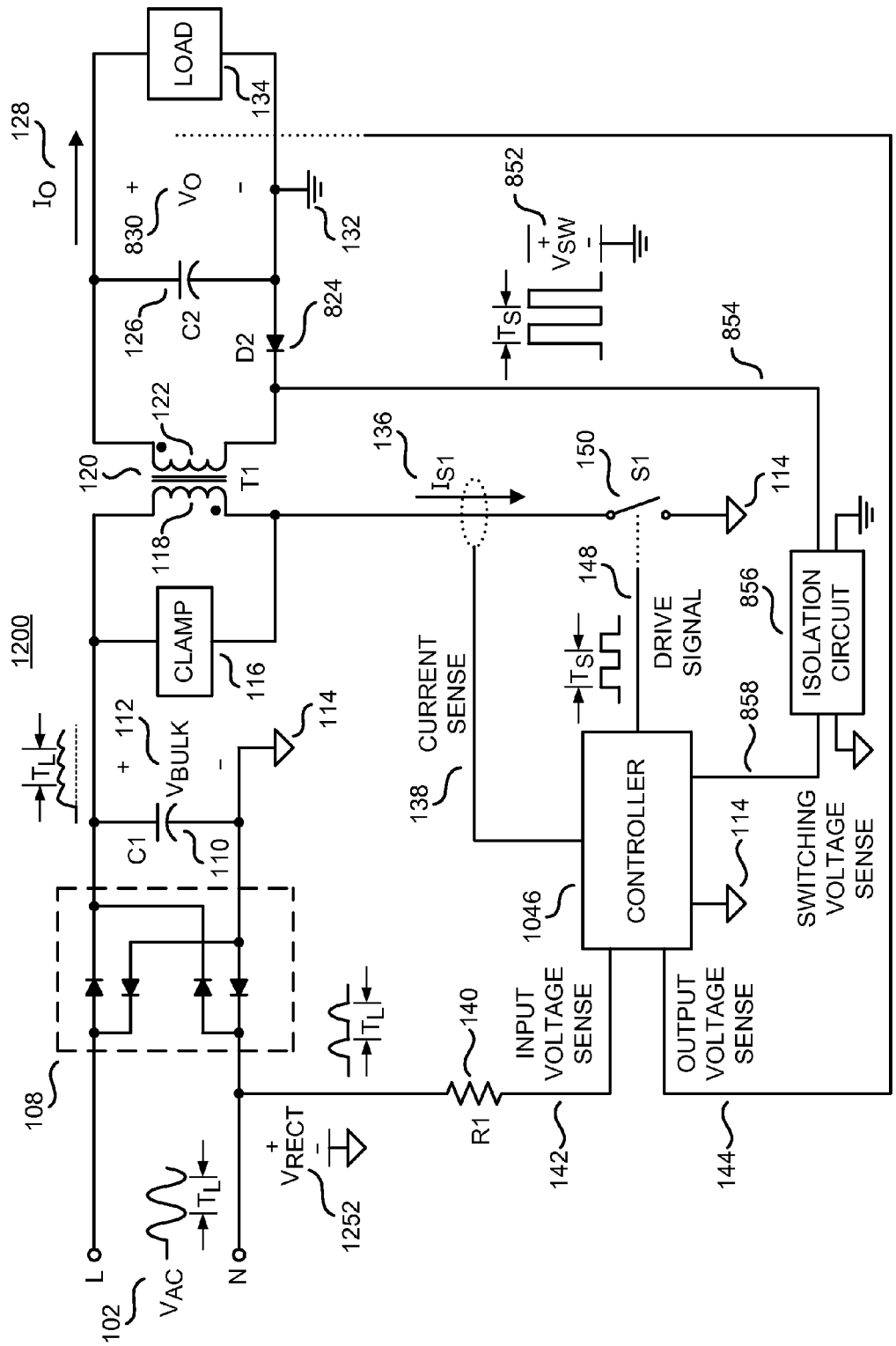
FIG. 12 is a schematic diagram of an example power converter that shows yet another alternative circuit and controller that senses an ac input voltage with low power consumption in accordance with the teachings of the present invention.

FIG. 12 is a schematic diagram 1200 of an example power converter that shows yet another alternative circuit and controller that senses an ac input voltage with low power consumption in accordance with the teachings of the present invention. The example power converter of FIG. 12 is obtained from the example of FIG. 10 by replacing diode 104 with a short circuit. With the modifications illustrated in FIG. 12, the rectified voltage $V_{RECT}$ 1252 will go negative with respect to the input return 114 by approximately one diode drop during the negative portions of the ac input voltage $V_{AC}$ 102. The alternative circuit illustrated in the example of FIG. 12 may be used with power converter controllers that can receive a negative current from the ac input voltage $V_{AC}$ 102 at terminal 142. Although the alternative circuit in the example of FIG. 12 discharges the parasitic capacitance 910 at one end of the input sensing resistor R1 140, a discharge current source $I_{CD}$ 920 may still be required to remove the charge from parasitic capacitance 915 at the input voltage sense terminal 142.

In one example, it is most important to reduce energy consumption associated with ac line sensing when the power converter is operating at a light or no load condition since energy consumed due to ac line sensing is a larger percentage of the overall power consumed by the power converter under these light or no load conditions. In the example of FIG. 12 for example, such conditions could be when load 134 is disconnected from power converter 1200 or when load 134 is consuming only a small percentage of a maximum power capability of power from power converter 1200 such as a standby power condition. In one example the controller 1046 may therefore continuously detect the input voltage sense signal at terminal 142 when load 134 is taking more than a threshold level of power from power converter 1200.

Detection of the power consumed by the load or the load level could be performed by using a load detection circuit. For example, in power converters with constant output voltage, the load level could be measured by measuring the output current. Similarly, in power converters that deliver constant current to the load, the load level can be measured by measuring the output voltage. In power converters that vary the average switching frequency with load to reduce no-load consumption (i.e. reduce average frequency with reducing load), the average switching frequency of switch S1 150 (in other words the reciprocal of the period $T_S$ of drive signal 148) of the power converter 1200 is another indication of power provided to load 134 in FIG. 12 so that the load level can be measured by measuring $T_S$ using a simple timer circuit. Therefore if the interval $T_S$ between times when switch 150 turns on is less than a first threshold value, the voltage sense signal at terminal 142 could be detected continuously. In one example, when the switching period $T_S$ is greater than a second threshold value, the voltage sense signal at terminal 142 could be detected periodically to become another example of an ac voltage sensor with low power consumption in accordance with the teachings of the present invention. In one example, the second threshold value could be approximately equal to 50 microseconds. In one example the difference between the first and second threshold value of $T_S$ could be a hysteresis of 5 microseconds. A hysteresis of 5 microseconds would set the second threshold value 5 microseconds greater than the first threshold value, and the first threshold value 5 microseconds less than the second threshold value. In one example, when the switching period $T_S$ is greater than the second threshold value, the voltage sense signal 142 could be detected during the time when the switch is off, just before the switch turns on at the beginning of the next switching period. The exact time of detection could be based on an assumption that the value of $T_S$ does not change dramatically from one switching period to the next, and that therefore a timing circuit within controller 1046 for example could be used to time the detection of the ac line sense signal 142.

Figure 13:
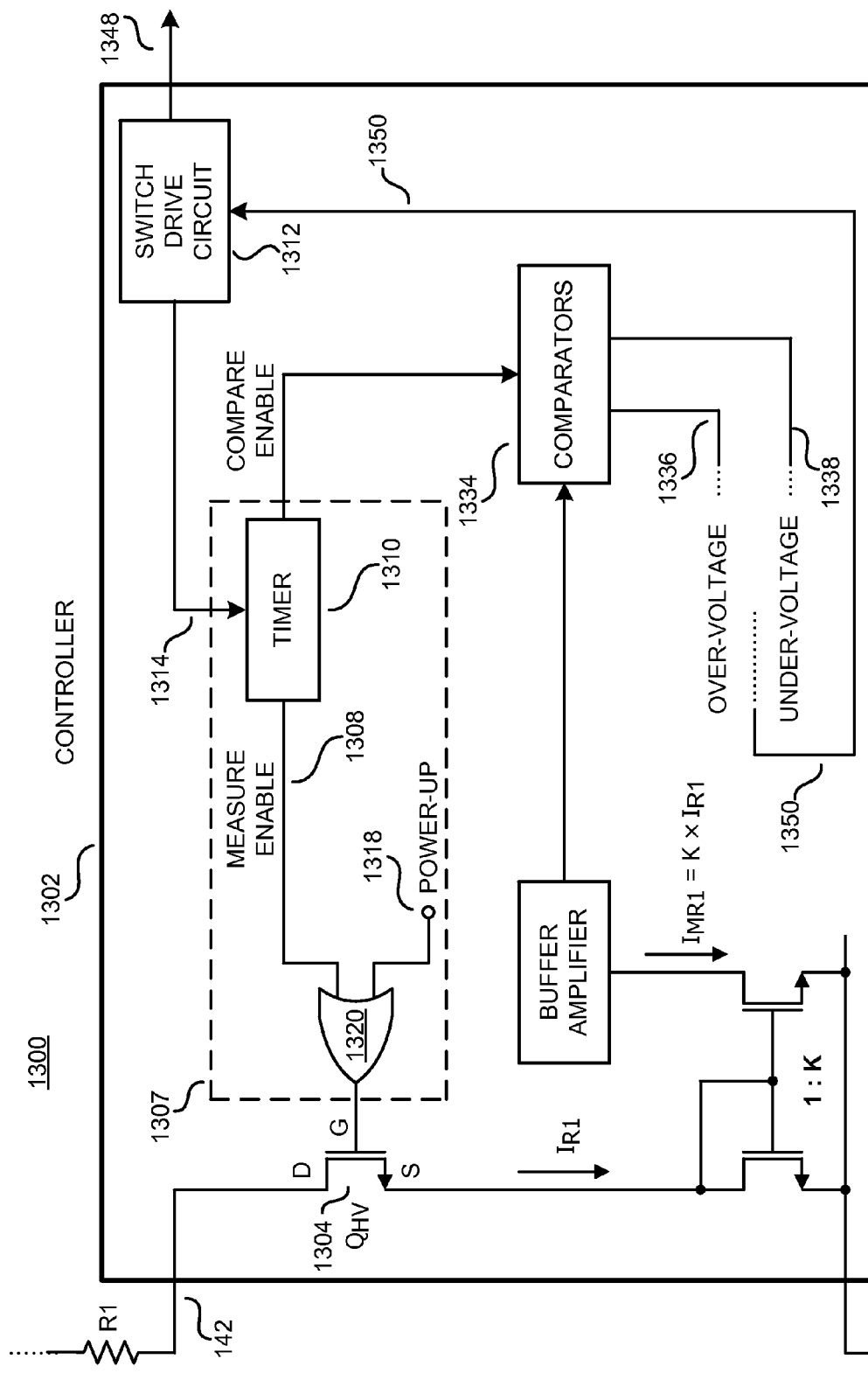
FIG. 13 is a functional block diagram that shows an alternative example power converter controller that senses an ac input voltage with low power consumption in accordance with the teachings of the present invention.

FIG. 13 shows an example functional block diagram of a controller where an ac line voltage sensor continuously senses a line voltage signal when the output power of a power converter is above a first threshold value and periodically senses the line voltage signal when the output power of the power converter output is below a second threshold value. The controller of FIG. 13 shares many details with the controller of FIG. 2A and for clarity therefore the description below focuses on the differences. For the purposes of the description below, it will also be assumed controller 1302 is employed in a power converter of the type shown in FIG. 12. It will be appreciated that the specific type of power converter is not critical, and the present invention could be applied to power converters described elsewhere such as FIGS. 1, 8, and 10 above.

In the example controller 1302, POWER-UP signal 1318 is high initially when controller 1302 starts operation and ensures that $Q_{HV}$ 1304 is on continuously while the power converter starts operating. In the example, switch drive circuit 1312 is the circuit block that provides the drive signal 1348 to an external switch, for example S1 150 in FIG. 12. As described above, a signal 1314 derived from circuit block 1312 can be used as an indication of the loading at the output of the power converter. In one example timer circuit 1310 is used to provide a MEASURE ENABLE signal 1308 that is continuously high when signal 1314 indicates a power converter power output is above a first threshold and is high only periodically when signal 1314 indicates the power converter output power is below a second threshold value. When the output of OR gate 1320 is high, high voltage switch $Q_{HV}$ 1304 is on and in accordance with previous descriptions above, signals 1336 and 1338 for example are generated to indicate under-voltage or over-voltage conditions at the ac input of the power converter.

It will be noted that in one example, when the power converter output power is below the second threshold value, timer 1310 will output a high MEASURE ENABLE signal 1308 for a duration just long enough for reliable detection of line sense signal 142. In one example, the duration is in the range of 10-50 microseconds. In one example, signal 1314 is equivalent to drive signal 1348 and timer circuit 1310 maintains MEASURE ENABLE signal 1308 continuously high when the time period between switching signals 1348 is less than approximately 45 microseconds. In one example timer circuit 1310 provides a MEASURE ENABLE signal 1308 that is periodically high when the time period between switching signals 1348 is greater than approximately 50 microseconds. In one example, when the time between switching signals 1348 being high is greater than 50 microseconds, timer circuit 1310 measures a time between switching signal 1348 being high on the previous switching period as a way to predict the correct time to set MEASURE ENABLE signal high again. In one example timer circuit 1310 will output a high MEASURE ENABLE signal 1308 just before the next switch drive signal 1348 high is provided.

In one example, the under-voltage and over-voltage information derived from this detection of the line voltage could be used to disable one or more switch drive signals as indicated by signal 1350. For example, this could be important to protect switch S1 150 in the power converter of FIG. 12 if an over-voltage condition were detected at the input of the power supply. In one example, the MEASURE ENABLE signal 1308 is held high while drive signal 1348 is high so that any under-voltage or over-voltage condition can be detected immediately and signal 1350 used to provide a low drive signal 1348 if necessary to protect the power converter.

It will be noted that there is no zero-crossing signal generated in the controller example of FIG. 13. To prevent false indications of an under-voltage condition, comparators 1334 may be restricted to assert an under-voltage signal only if an under-voltage condition exists continuously for a minimum duration, such as for example one entire ac line period $T_L$. In other examples, a zero crossing detection circuit could be included to further reduce power consumption by synchronizing the measurement enable signal to enable the input sensing circuitry only at the peaks of the ac input voltage.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A power converter controller, comprising:
   an input sense circuit to receive an input sense signal representative of an input of a power converter;
   a zero-crossing detector coupled to the input sense circuit to be responsive to the input sense signal falling below a first zero-crossing threshold and rising above a second zero-crossing threshold to determine zero-crossing intervals of the input of the power converter;
   a timer circuit coupled to the zero-crossing detector to determine peak intervals of the input of the power converter in response to the zero-crossing intervals, the timer circuit coupled to generate an enable signal in response to the zero-crossing detector, wherein the enable signal is coupled to be received by the input sense circuit, to synchronize sensing of the input of the power converter to occur during the peak intervals of the input of the power converter; and
   a comparator circuit coupled to the input sense circuit and the timer circuit, wherein the comparator is coupled to detect if the input of the power converter is greater or less than one or more thresholds during the peak intervals of the input of the power converter.

2. The power converter controller of claim 1 wherein the input sense circuit is a current input sense circuit, and wherein the input sense signal representative of the input of the power converter is a current.

3. The power converter controller of claim 1 wherein input sense circuit comprises a high voltage transistor coupled to receive the input sense signal.

4. The power converter controller of claim 3 wherein the input sense circuit further comprises a low voltage transistor coupled to the high voltage transistor, wherein the low voltage transistor is coupled to be switched in response to the timer circuit.

5. The power converter of claim 4 wherein the low voltage transistor is coupled to be open during the zero-crossing intervals, wherein the input sense circuit further comprises a current source coupled to the low voltage transistor to discharge a parasitic capacitance when the low voltage transistor is open.

6. The power converter controller of claim 3 wherein the high voltage transistor is coupled to be switched in response to the timer circuit.

7. The power converter controller of claim 1 wherein the input sense circuit comprises a current mirror circuit coupled to receive the input sense signal representative of the input of the power converter, wherein the current mirror circuit is coupled to generate a scaled representation of the input sense signal.

8. The power converter controller of claim 7 wherein the input sense circuit further comprises a buffer amplifier circuit coupled to the current mirror circuit, wherein the buffer amplifier circuit is coupled to output the scaled representation of the input sense signal to the comparator circuit.

9. The power converter controller of claim 1 wherein the one or more thresholds include one or more of an under-voltage threshold and an over-voltage threshold.

10. A power converter, comprising:
an energy transfer element coupled between an input of the power converter and an output of the power converter;
a power switch coupled to the input of the power converter and the energy transfer element; and
a power converter controller coupled to generate a drive signal coupled to control switching of the power switch to control a transfer of energy from the input of the power converter to the output of the power converter in response to a feedback signal representative of the output of the power converter, wherein the power converter includes:
an input sense circuit to receive an input sense signal representative of an input of a power converter;
a zero-crossing detector coupled to the input sense circuit to be responsive to the input sense signal falling below a first zero-crossing threshold and rising above a second zero-crossing threshold to determine zero-crossing intervals of the input of the power converter;
a timer circuit coupled to the zero-crossing detector to determine peak intervals of the input of the power converter in response to the zero-crossing intervals, the timer circuit coupled to generate an enable signal in response to the zero-crossing detector, wherein the enable signal is coupled to be received by the input sense circuit, to synchronize sensing of the input of the power converter to occur during the peak intervals of the input of the power converter; and
a comparator circuit coupled to the input sense circuit and the timer circuit, wherein the comparator is coupled to detect if the input of the power converter is greater or less than one or more thresholds during the peak intervals of the input of the power converter.

11. The power converter of claim 10 wherein the power converter controller is coupled to receive a current sense signal representative of a current through the power switch, wherein the power converter controller is further coupled to generate the drive signal coupled to control switching of the power switch to control the transfer of energy from the input of the power converter to the output of the power converter in response to current sense signal.

12. The power converter of claim 10 wherein the input sense circuit is a current input sense circuit, and wherein the input sense signal representative of the input of the power converter is a current.

13. The power converter controller of claim 10 wherein input sense circuit comprises a high voltage transistor coupled to receive input sense signal.

14. The power converter controller of claim 13 wherein input sense circuit further comprises a low voltage transistor coupled to the high voltage transistor, wherein the low voltage transistor is coupled to be switched in response to the timer circuit.

15. The power converter controller of claim 14 wherein the low voltage transistor is coupled to be open during the zero-crossing intervals, wherein the input sense circuit further comprises a current source coupled to the low voltage transistor to discharge a parasitic capacitance when the low voltage transistor is open.

16. The power converter controller of claim 14 wherein the high voltage transistor is coupled to be switched in response to the timer circuit.

17. The power converter controller of claim 10 wherein the input sense circuit comprises a current mirror circuit coupled to receive the input sense signal representative of the input of the power converter, wherein the current mirror circuit is coupled to generate a scaled representation of the input sense signal.

18. The power converter controller of claim 17 wherein the input sense circuit further comprises a buffer amplifier circuit coupled to the current mirror circuit, wherein the buffer amplifier circuit is coupled to output the scaled representation of the input sense signal to the comparator circuit.

19. The power converter controller of claim 10 wherein the one or more thresholds include one or more of an under-voltage threshold and an over-voltage threshold.

20. A method for sensing an input of a power converter, comprising:
receiving an input sense signal representative of the input of the power converter;
detecting zero-crossing intervals of an ac input voltage in response to the input sense signal falling below a first zero-crossing threshold and rising above a second zero-crossing threshold;
synchronizing a timer to the ac input voltage in response to the detected zero-crossing intervals;
closing a line sense switch in response to the timer to enable sensing of the input sense signal during peak intervals of the ac input line voltage; and
opening the line sense switch in response to the timer to disable sensing of the input sense signal during intervals other than the peak intervals of the ac input line voltage.

21. The method of claim 20 further comprising asserting an over-voltage signal in response to the input sense signal being greater than a first threshold.

22. The method of claim 20 further comprising asserting an under-voltage signal in response to the input sense signal being less than a second threshold.

23. The method of claim 20 further comprising sampling the input sense signal during the peak intervals.

24. The method of claim 23 further comprising analyzing the input sense signal samples to determine when to indicate over-voltage and under-voltage conditions.

25. The method of claim 24 wherein analyzing the input sense signal samples comprises averaging the input sense signal samples.

26. The method of claim 24 wherein analyzing the input sense signal samples comprises looking for sequences of increasing and decreasing values of the input sense signal samples.

27. The method of claim 24 wherein analyzing the input sense signal samples comprises adjusting a timing of the timer in response to the input sense signal samples.

\* \* \* \* \*